(12) United States Patent
Tang et al.

(10) Patent No.: US 8,456,766 B2
(45) Date of Patent: Jun. 4, 2013

(54) PHOTOGRAPHING OPTICAL SYSTEM

(75) Inventors: Hsiang Chi Tang, Taichung (TW); Hsin Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 265 days.

(21) Appl. No.: 13/015,214

(22) Filed: Jan. 27, 2011

(65) Prior Publication Data

US 2012/0140105 A1 Jun. 7, 2012

(30) Foreign Application Priority Data

Dec. 2, 2010 (TW) .................................. 99141868 A

(51) Int. Cl.
*G02B 9/34* (2006.01)
(52) U.S. Cl.
USPC .......................................................... 359/771
(58) Field of Classification Search
USPC ... 359/712, 715, 727–734, 773, 771; 348/340
See application file for complete search history.

(56) References Cited

U.S. PATENT DOCUMENTS

| 7,184,225 B1 | 2/2007 | Noda | |
| 7,466,497 B2 * | 12/2008 | Park et al. | 359/715 |
| 2012/0086848 A1 * | 4/2012 | Tsai et al. | 348/340 |

* cited by examiner

*Primary Examiner* — Scott J Sugarman
*Assistant Examiner* — Mustak Choudhury
(74) *Attorney, Agent, or Firm* — Morris Manning & Martin LLP; Tim Tingkang Xia, Esq.

(57) ABSTRACT

This invention provides a photographing optical system, in order from an object side to an image side comprising: a first lens element with positive refractive power having a convex object-side surface and concave image-side surface; a second lens element with negative refractive power; a third lens element with positive refractive power having a concave object-side surface and a convex image-side surface; and a fourth lens element with negative refractive power having a concave image-side surface and both the object-side and image-side surfaces thereof being aspheric; wherein the photographing optical system has four lens elements with refractive power. By such arrangement, the total track length and photosensitivity of the photographing optical system can be effectively reduced, and high image resolution can be obtained.

19 Claims, 30 Drawing Sheets

| TABLE 1 | | | | | | |
|---|---|---|---|---|---|---|
| (Embodiment 1) | | | | | | |
| f = 2.98 mm, Fno = 2.48, HFOV = 32.8 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.200 | | | | |
| 2 | Lens 1 | 1.00481 (ASP) | 0.443 | Plastic | 1.544 | 55.9 | 2.17 |
| 3 | | 5.72560 (ASP) | 0.188 | | | | |
| 4 | Lens 2 | -9.45000 (ASP) | 0.290 | Plastic | 1.634 | 23.8 | -4.42 |
| 5 | | 4.02510 (ASP) | 0.349 | | | | |
| 6 | Lens 3 | -1.49211 (ASP) | 0.631 | Plastic | 1.544 | 55.9 | 2.27 |
| 7 | | -0.77707 (ASP) | 0.333 | | | | |
| 8 | Lens 4 | 100.00000 (ASP) | 0.339 | Plastic | 1.544 | 55.9 | -2.10 |
| 9 | | 1.13036 (ASP) | 0.300 | | | | |
| 10 | IR-filter | Plano | 0.300 | Glass | 1.517 | 64.2 | - |
| 11 | | Plano | 0.340 | | | | |
| 12 | Image | Plano | - | | | | |
| Note: Reference wavelength is d-line(587.6 nm) | | | | | | | |

Fig.8

| TABLE 2 | | | | |
|---|---|---|---|---|
| Aspheric Coefficients | | | | |
| Surface # | 2 | 3 | 4 | 5 |
| k = | 3.32492E-01 | -4.69427E+01 | -8.10502E+01 | 3.13512E+01 |
| A4 = | 1.69746E-03 | 1.91588E-01 | 2.57383E-01 | 3.52501E-01 |
| A6 = | 1.15258E-01 | -2.52697E-01 | -1.19641E+00 | -3.19346E-01 |
| A8 = | -3.34019E-01 | 1.93664E+00 | 2.79807E+00 | -4.96087E-02 |
| A10 = | 8.57313E-01 | -3.60147E+00 | -3.44742E+00 | |
| A12 = | | | -6.83722E+00 | |
| Surface # | 6 | 7 | 8 | 9 |
| k = | 8.51262E-01 | -3.45902E+00 | -9.00000E+01 | -7.25567E+00 |
| A4 = | 8.46770E-02 | -3.82749E-01 | -1.67528E-01 | -1.70593E-01 |
| A6 = | -3.14076E-01 | 4.46531E-01 | 9.95755E-02 | 1.05133E-01 |
| A8 = | 1.11581E+00 | -4.29240E-01 | -1.01540E-02 | -4.67131E-02 |
| A10 = | -3.31200E+00 | -8.97350E-02 | -1.95781E-04 | 1.10841E-02 |
| A12 = | 5.73478E+00 | 3.87361E-01 | -3.30025E-03 | -4.72539E-04 |
| A14 = | -2.29096E+00 | 1.38724E-01 | 1.44674E-03 | -2.65372E-04 |
| A16 = | -1.54897E+00 | -2.83662E-01 | -1.70712E-04 | 3.36182E-05 |

Fig.9

| TABLE 3 | | | | | | | |
|---|---|---|---|---|---|---|---|
| (Embodiment 2) | | | | | | | |
| f = 2.96 mm, Fno = 2.45, HFOV = 33.0 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.190 | | | | |
| 2 | Lens 1 | 1.01527 (ASP) | 0.462 | Plastic | 1.544 | 55.9 | 2.18 |
| 3 | | 5.86610 (ASP) | 0.173 | | | | |
| 4 | Lens 2 | -10.43860 (ASP) | 0.298 | Plastic | 1.634 | 23.8 | -4.59 |
| 5 | | 4.07550 (ASP) | 0.335 | | | | |
| 6 | Lens 3 | -1.51958 (ASP) | 0.600 | Plastic | 1.544 | 55.9 | 2.37 |
| 7 | | -0.79448 (ASP) | 0.331 | | | | |
| 8 | Lens 4 | -42.24660 (ASP) | 0.370 | Plastic | 1.544 | 55.9 | -2.19 |
| 9 | | 1.22929 (ASP) | 0.300 | | | | |
| 10 | IR-filter | Plano | 0.300 | Glass | 1.517 | 64.2 | - |
| 11 | | Plano | 0.336 | | | | |
| 12 | Image | Plano | - | | | | |
| Note: Reference wavelength is d-line(587.6 nm) | | | | | | | |

Fig.10

| TABLE 4 | | | | |
|---|---|---|---|---|
| Aspheric Coefficients | | | | |
| Surface # | 2 | 3 | 4 | 5 |
| k = | 3.44759E-01 | -3.39151E+01 | -2.63672E+01 | 3.13373E+01 |
| A4 = | -1.45625E-03 | 1.97045E-01 | 2.45246E-01 | 3.37237E-01 |
| A6 = | 1.24398E-01 | -2.45346E-01 | -1.17051E+00 | -4.01178E-01 |
| A8 = | -3.91391E-01 | 1.81477E+00 | 2.75762E+00 | 6.75910E-02 |
| A10 = | 9.05588E-01 | -3.48517E+00 | -3.27972E+00 | |
| A12 = | | | -6.89224E+00 | |
| Surface # | 6 | 7 | 8 | 9 |
| k = | 6.49645E-01 | -3.65312E+00 | -9.00000E+01 | -7.93149E+00 |
| A4 = | 1.00670E-01 | -4.03979E-01 | -1.65707E-01 | -1.69523E-01 |
| A6 = | -3.24605E-01 | 4.89340E-01 | 9.96626E-02 | 1.01614E-01 |
| A8 = | 1.14196E+00 | -3.97068E-01 | -9.98250E-03 | -4.65805E-02 |
| A10 = | -3.32934E+00 | -1.24473E-01 | -1.88480E-04 | 1.11831E-02 |
| A12 = | 5.69373E+00 | 3.80145E-01 | -3.29411E-03 | -4.62579E-04 |
| A14 = | -2.21535E+00 | 1.56249E-01 | 1.44726E-03 | -2.63467E-04 |
| A16 = | -1.09495E+00 | -2.43069E-01 | -1.73166E-04 | 3.24079E-05 |

Fig.11

| TABLE 5 | | | | | | |
|---|---|---|---|---|---|---|
| (Embodiment 3) | | | | | | |
| f = 2.99 mm, Fno = 2.80, HFOV = 32.9 deg. | | | | | | |
| Surface # | | Curvature Radius | Thickness | Material | Index | Abbe # | Focal length |
| 0 | Object | Plano | Infinity | | | | |
| 1 | Lens 1 | 1.00975 (ASP) | 0.466 | Plastic | 1.530 | 55.8 | 2.30 |
| 2 | | 4.99540 (ASP) | 0.040 | | | | |
| 3 | Ape. Stop | Plano | 0.125 | | | | |
| 4 | Lens 2 | -13.11800 (ASP) | 0.284 | Plastic | 1.650 | 21.4 | -4.79 |
| 5 | | 4.11310 (ASP) | 0.361 | | | | |
| 6 | Lens 3 | -1.50136 (ASP) | 0.636 | Plastic | 1.544 | 55.9 | 2.24 |
| 7 | | -0.77389 (ASP) | 0.372 | | | | |
| 8 | Lens 4 | 36.44330 (ASP) | 0.368 | Plastic | 1.544 | 55.9 | -2.14 |
| 9 | | 1.12409 (ASP) | 0.300 | | | | |
| 10 | IR-filter | Plano | 0.300 | Glass | 1.517 | 64.2 | - |
| 11 | | Plano | 0.349 | | | | |
| 12 | Image | Plano | - | | | | |
| Note: Reference wavelength is d-line(587.6 nm) | | | | | | | |

Fig.12

| TABLE 6 | | | | |
|---|---|---|---|---|
| Aspheric Coefficients | | | | |
| Surface # | 1 | 2 | 4 | 5 |
| k    = | 3.20237E-01 | -3.93138E+01 | -7.88342E+01 | 3.07274E+01 |
| A4 = | -2.54364E-03 | 1.94729E-01 | 2.57376E-01 | 3.51146E-01 |
| A6 = | 1.14451E-01 | -2.54168E-01 | -1.19551E+00 | -3.20772E-01 |
| A8 = | -3.17372E-01 | 1.89805E+00 | 2.78609E+00 | -5.66438E-02 |
| A10 = | 8.47888E-01 | -3.56275E+00 | -3.64566E+00 | |
| A12 = | | | -6.61448E+00 | |
| Surface # | 6 | 7 | 8 | 9 |
| k    = | 6.89751E-01 | -3.76229E+00 | -1.43331E+01 | -7.37089E+00 |
| A4 = | 9.54781E-02 | -3.90528E-01 | -1.65733E-01 | -1.64271E-01 |
| A6 = | -2.96844E-01 | 4.37572E-01 | 9.96337E-02 | 1.04506E-01 |
| A8 = | 1.13502E+00 | -4.34280E-01 | -1.01087E-02 | -4.66945E-02 |
| A10 = | -3.30673E+00 | -9.19257E-02 | -1.87468E-04 | 1.11687E-02 |
| A12 = | 5.84637E+00 | 3.86950E-01 | -3.29479E-03 | -4.43259E-04 |
| A14 = | -2.18276E+00 | 1.41637E-01 | 1.44974E-03 | -2.58663E-04 |
| A16 = | -1.61294E+00 | -2.78225E-01 | -1.68695E-04 | 3.51716E-05 |

Fig.13

| TABLE 7 | | | | | | | |
|---|---|---|---|---|---|---|---|
| (Embodiment 4) | | | | | | | |
| f = 2.99 mm, Fno = 2.80, HFOV = 32.9 deg. | | | | | | | |
| Surface # | | Curvature Radius | Thickness | Material | Index | Abbe # | Focal length |
| 0 | Object | Plano | Infinity | | | | |
| 1 | Lens 1 | 1.02112 (ASP) | 0.503 | Plastic | 1.544 | 55.9 | 2.23 |
| 2 | | 5.34870 (ASP) | 0.060 | | | | |
| 3 | Ape. Stop | Plano | 0.104 | | | | |
| 4 | Lens 2 | -12.61300 (ASP) | 0.289 | Plastic | 1.634 | 23.8 | -4.91 |
| 5 | | 4.17070 (ASP) | 0.318 | | | | |
| 6 | Lens 3 | -1.51790 (ASP) | 0.616 | Plastic | 1.544 | 55.9 | 2.35 |
| 7 | | -0.79374 (ASP) | 0.325 | | | | |
| 8 | Lens 4 | -49.56370 (ASP) | 0.372 | Plastic | 1.544 | 55.9 | -2.21 |
| 9 | | 1.23449 (ASP) | 0.300 | | | | |
| 10 | IR-filter | Plano | 0.300 | Glass | 1.517 | 64.2 | - |
| 11 | | Plano | 0.330 | | | | |
| 12 | Image | Plano | - | | | | |
| Note: Reference wavelength is d-line(587.6 nm) | | | | | | | |

Fig.14

| TABLE 8 | | | | |
|---|---|---|---|---|
| Aspheric Coefficients | | | | |
| Surface # | 1 | 2 | 4 | 5 |
| k   = | 3.34839E-01 | -2.62447E+01 | -1.26836E+01 | 3.13221E+01 |
| A4 = | -4.01974E-03 | 2.00582E-01 | 2.43037E-01 | 3.38175E-01 |
| A6 = | 1.21094E-01 | -2.37512E-01 | -1.17075E+00 | -4.02624E-01 |
| A8 = | -3.99503E-01 | 1.83629E+00 | 2.78105E+00 | 6.40679E-02 |
| A10 = | 8.72204E-01 | -3.40732E+00 | -3.07422E+00 | |
| A12 = | | | -6.89224E+00 | |
| Surface # | 6 | 7 | 8 | 9 |
| k   = | 6.50041E-01 | -3.73747E+00 | -4.45000E+01 | -8.28454E+00 |
| A4 = | 9.96708E-02 | -4.05306E-01 | -1.65862E-01 | -1.72448E-01 |
| A6 = | -3.20815E-01 | 4.86414E-01 | 9.96539E-02 | 1.02043E-01 |
| A8 = | 1.14905E+00 | -3.98886E-01 | -9.97637E-03 | -4.64780E-02 |
| A10 = | -3.31866E+00 | -1.25459E-01 | -1.83281E-04 | 1.12029E-02 |
| A12 = | 5.69373E+00 | 3.80145E-01 | -3.29113E-03 | -4.60816E-04 |
| A14 = | -2.21535E+00 | 1.56249E-01 | 1.44880E-03 | -2.63603E-04 |
| A16 = | -1.09495E+00 | -2.43069E-01 | -1.72573E-04 | 3.24652E-05 |

Fig.15

| TABLE 9 | | | | | | |
|---|---|---|---|---|---|---|
| (Embodiment 5) | | | | | | |
| f = 2.94 mm, Fno = 2.80, HFOV= 31.5 deg. | | | | | | |
| Surface # | | Curvature Radius | Thickness | Material | Index | Abbe # | Focal length |
| 0 | Object | Plano | Infinity | | | | |
| 1 | Ape. Stop | Plano | 0.019 | | | | |
| 2 | Lens 1 | 1.07141 (ASP) | 0.596 | Plastic | 1.544 | 55.9 | 2.18 |
| 3 | | 8.86170 (ASP) | 0.149 | | | | |
| 4 | Lens 2 | -6.63800 (ASP) | 0.283 | Plastic | 1.634 | 23.8 | -4.43 |
| 5 | | 4.95220 (ASP) | 0.282 | | | | |
| 6 | Lens 3 | -1.70894 (ASP) | 0.522 | Plastic | 1.544 | 55.9 | 2.32 |
| 7 | | -0.80497 (ASP) | 0.382 | | | | |
| 8 | Lens 4 | -10.31750 (ASP) | 0.343 | Plastic | 1.544 | 55.9 | -1.98 |
| 9 | | 1.21371 (ASP) | 0.300 | | | | |
| 10 | IR-filter | Plano | 0.300 | Glass | 1.517 | 64.2 | - |
| 11 | | Plano | 0.289 | | | | |
| 12 | Image | Plano | - | | | | |
| Note: Reference wavelength is d-line(587.6 nm) | | | | | | |

Fig.16

| TABLE 10 | | | | |
|---|---|---|---|---|
| Aspheric Coefficients | | | | |
| Surface # | 2 | 3 | 4 | 5 |
| k = | 2.47223E-01 | -2.15544E+01 | -4.18186E+01 | 3.30940E+01 |
| A4 = | -2.73600E-02 | 2.06259E-01 | 2.56348E-01 | 3.42305E-01 |
| A6 = | 1.19455E-01 | -2.72741E-01 | -1.07949E+00 | -3.94371E-01 |
| A8 = | -4.56944E-01 | 1.78488E+00 | 2.98610E+00 | 7.77363E-02 |
| A10 = | 6.49738E-01 | -3.75286E+00 | -2.61562E+00 | |
| A12 = | | | -6.89224E+00 | |
| Surface # | 6 | 7 | 8 | 9 |
| k = | 6.35484E-01 | -3.76380E+00 | -3.31250E+01 | -8.80878E+00 |
| A4 = | 1.12857E-01 | -3.90875E-01 | -1.61971E-01 | -1.67786E-01 |
| A6 = | -3.19605E-01 | 5.14719E-01 | 1.00044E-01 | 9.94386E-02 |
| A8 = | 1.14597E+00 | -3.74319E-01 | -9.94414E-03 | -4.69340E-02 |
| A10 = | -3.35204E+00 | -1.08636E-01 | -1.94189E-04 | 1.11527E-02 |
| A12 = | 5.51992E+00 | 3.91095E-01 | -3.30304E-03 | -4.80416E-04 |
| A14 = | -2.21535E+00 | 1.76642E-01 | 1.43815E-03 | -2.67226E-04 |
| A16 = | -1.09495E+00 | -2.26993E-01 | -1.78012E-04 | 3.23202E-05 |

Fig.17

| TABLE 11 | | | | | | |
|---|---|---|---|---|---|---|
| (Embodiment 6) | | | | | | |
| f = 2.85 mm, Fno = 2.80, HFOV = 33.9 deg. | | | | | | |
| Surface # | | Curvature Radius | Thickness | Material | Index | Abbe # | Focal length |
| 0 | Object | Plano | Infinity | | | | |
| 1 | Lens 1 | 1.02032 (ASP) | 0.456 | Plastic | 1.530 | 55.8 | 2.62 |
| 2 | | 3.26500 (ASP) | 0.080 | | | | |
| 3 | Ape. Stop | Plano | 0.120 | | | | |
| 4 | Lens 2 | 7.05600 (ASP) | 0.280 | Plastic | 1.650 | 21.4 | -5.88 |
| 5 | | 2.43889 (ASP) | 0.344 | | | | |
| 6 | Lens 3 | -2.06264 (ASP) | 0.758 | Plastic | 1.535 | 56.3 | 1.79 |
| 7 | | -0.73655 (ASP) | 0.295 | | | | |
| 8 | Lens 4 | -20.69530 (ASP) | 0.327 | Plastic | 1.535 | 56.3 | -1.95 |
| 9 | | 1.10188 (ASP) | 0.300 | | | | |
| 10 | IR-filter | Plano | 0.300 | Glass | 1.517 | 64.2 | - |
| 11 | | Plano | 0.340 | | | | |
| 12 | Image | Plano | - | | | | |
| Note: Reference wavelength is d-line(587.6 nm) | | | | | | | |

Fig.18

| TABLE 12 | | | | |
|---|---|---|---|---|
| Aspheric Coefficients | | | | |
| Surface # | 1 | 2 | 4 | 5 |
| k = | 1.47075E-01 | -2.29815E+01 | -9.00000E+01 | 1.14827E+01 |
| A4 = | 2.20848E-02 | 2.44248E-01 | -9.57472E-02 | 2.46991E-02 |
| A6 = | 1.69467E-01 | -9.04317E-01 | -3.45969E-01 | -6.57122E-01 |
| A8 = | -5.07751E-01 | 1.63533E+00 | -2.61514E+00 | 7.31123E-01 |
| A10 = | 1.36973E+00 | -1.01945E+00 | 4.77436E+00 | -1.82033E+00 |
| A12 = | -5.29871E-01 | 5.84100E-04 | -7.85187E+00 | 2.22721E-01 |
| A14 = | -1.80478E+00 | -3.09567E+00 | 2.65236E+00 | -2.56981E-01 |
| Surface # | 6 | 7 | 8 | 9 |
| k = | 2.72698E+00 | -3.55271E+00 | -3.54013E+01 | -6.82283E+00 |
| A4 = | -3.84277E-02 | -4.78516E-01 | -1.49191E-01 | -1.55791E-01 |
| A6 = | -2.17433E-01 | 5.20688E-01 | 9.86992E-02 | 9.65981E-02 |
| A8 = | 9.70815E-01 | -3.98511E-01 | -1.03683E-02 | -4.56062E-02 |
| A10 = | -3.10792E+00 | -1.50266E-01 | -1.57207E-04 | 1.16595E-02 |
| A12 = | 6.27010E+00 | 3.30501E-01 | -3.23286E-03 | -4.17665E-04 |
| A14 = | -2.96401E+00 | 1.34146E-01 | 1.45588E-03 | -2.66853E-04 |
| A16 = | -7.58299E+00 | -2.27743E-01 | -1.79573E-04 | 2.40416E-05 |

Fig.19

| TABLE 13 | | | | | | | |
|---|---|---|---|---|---|---|---|
| (Embodiment 7) | | | | | | | |
| f = 2.92 mm, Fno = 2.53, HFOV = 33.3 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.173 | | | | |
| 2 | Lens 1 | 1.02533 (ASP) | 0.401 | Plastic | 1.544 | 55.9 | 2.21 |
| 3 | | 6.02140 (ASP) | 0.199 | | | | |
| 4 | Lens 2 | -9.75570 (ASP) | 0.280 | Plastic | 1.634 | 23.8 | -4.87 |
| 5 | | 4.56500 (ASP) | 0.368 | | | | |
| 6 | Lens 3 | -1.33943 (ASP) | 0.508 | Plastic | 1.544 | 55.9 | 2.43 |
| 7 | | -0.75394 (ASP) | 0.363 | | | | |
| 8 | Lens 4 | 100.00000 (ASP) | 0.300 | Plastic | 1.544 | 55.9 | -2.37 |
| 9 | | 1.27160 (ASP) | 0.300 | | | | |
| 10 | IR-filter | Plano | 0.600 | Glass | 1.517 | 64.2 | - |
| 11 | | Plano | 0.209 | | | | |
| 12 | Image | Plano | - | | | | |
| Note: Reference wavelength is d-line(587.6 nm) | | | | | | | |

Fig.20

| TABLE 14 | | | | |
|---|---|---|---|---|
| Aspheric Coefficients | | | | |
| Surface # | 2 | 3 | 4 | 5 |
| k  = | 2.63036E-01 | -4.82998E+01 | -7.96602E+01 | 3.96676E+01 |
| A4 = | 2.08558E-02 | 2.35657E-01 | 2.72557E-01 | 2.38259E-01 |
| A6 = | -2.48629E-02 | -2.24840E-01 | -1.35602E+00 | -6.82257E-02 |
| A8 = | 4.09220E-01 | 9.55621E-01 | 3.44093E+00 | -4.21896E-01 |
| A10 = | 6.77211E-01 | 1.14732E+00 | -2.14961E+00 | |
| A12 = | | | -7.10923E+00 | |
| Surface # | 6 | 7 | 8 | 9 |
| k  = | 1.20402E+00 | -3.25321E+00 | 1.00000E+00 | -8.02921E+00 |
| A4 = | -2.35791E-03 | -4.48428E-01 | -1.53348E-01 | -1.61059E-01 |
| A6 = | -1.58959E-01 | 4.52749E-01 | 9.06521E-02 | 8.93199E-02 |
| A8 = | 1.40280E+00 | -3.62325E-01 | -1.06398E-02 | -4.24610E-02 |
| A10 = | -3.65641E+00 | 2.43942E-03 | 1.78684E-04 | 1.13098E-02 |
| A12 = | 5.54239E+00 | 3.98098E-01 | -3.27171E-03 | -7.25122E-04 |
| A14 = | -2.54732E+00 | 1.19224E-01 | 1.54605E-03 | -2.96565E-04 |
| A16 = | -1.81483E+00 | -2.65256E-01 | -2.02923E-04 | 4.82217E-05 |

Fig.21

TABLE 15

| | Embodiment 1 | Embodiment 2 | Embodiment 3 | Embodiment 4 | Embodiment 5 | Embodiment 6 | Embodiment 7 |
|---|---|---|---|---|---|---|---|
| f | 2.98 | 2.96 | 2.99 | 2.99 | 2.94 | 2.85 | 2.92 |
| Fno | 2.48 | 2.45 | 2.80 | 2.80 | 2.80 | 2.80 | 2.53 |
| HFOV | 32.8 | 33.0 | 32.9 | 32.9 | 31.5 | 33.9 | 33.3 |
| V1−V2 | 32.1 | 32.1 | 34.4 | 32.1 | 32.1 | 34.4 | 32.1 |
| T12/T23 | 0.54 | 0.52 | 0.46 | 0.52 | 0.53 | 0.58 | 0.54 |
| T23/T34 | 1.05 | 1.01 | 0.97 | 0.98 | 0.74 | 1.17 | 1.01 |
| CT4/f | 0.11 | 0.13 | 0.12 | 0.12 | 0.12 | 0.11 | 0.10 |
| (R1+R2)/(R1−R2) | −1.43 | −1.42 | −1.51 | −1.47 | −1.28 | −1.91 | −1.41 |
| (R3+R4)/(R3−R4) | 0.40 | 0.44 | 0.52 | 0.50 | 0.15 | 2.06 | 0.36 |
| (R5+R6)/(R5−R6) | 3.17 | 3.19 | 3.13 | 3.19 | 2.78 | 2.11 | 3.58 |
| |R8/R7| | 0.01 | 0.03 | 0.03 | 0.02 | 0.12 | 0.05 | 0.01 |
| f3/f2 | −0.51 | −0.52 | −0.47 | −0.48 | −0.52 | −0.30 | −0.50 |
| SAG41max/SAG42max | −0.67 | −0.92 | −0.52 | −0.95 | −1.27 | −0.61 | −0.80 |
| Yp41/Yp42 | 1.22 | 1.32 | 1.11 | 1.33 | 1.29 | 1.07 | 1.38 |
| SL/TTL | 0.94 | 0.94 | 0.86 | 0.84 | 1.01 | 0.85 | 0.95 |
| TTL/ImgH | 1.77 | 1.77 | 1.82 | 1.77 | 1.86 | 1.82 | 1.73 |

Fig. 22

PHOTOGRAPHING OPTICAL SYSTEM

CROSS-REFERENCE TO RELATED APPLICATIONS

This non-provisional application claims priority under 35 U.S.C. §119(a) on Patent Application No(s). 099141868 filed in Taiwan, R.O.C. on Dec. 2, 2010, the entire contents of which are hereby incorporated by reference.

BACKGROUND OF THE INVENTION

1. Field of the Invention

The present invention relates to a photographing optical system, and more particularly, to a compact photographing optical system used in electronic products.

2. Description of the Prior Art

The demand for compact imaging lens assembly has grown in recent years as the popularity of portable electronic products with the photographing function has increased. The sensor of a general photographing camera is none other than CCD (Charge Coupled Device) or CMOS (Complementary Metal Oxide Semiconductor Sensor). Furthermore, as advanced semiconductor manufacturing technology has allowed the pixel size of sensors to be reduced, and the current electronic products are leaning toward a trend of being more compact with more functionalities, there is an increasing demand for compact imaging lens assembly featuring better image quality.

A conventional compact imaging lens system equipped on a portable electronic product is often composed of three lens elements such as the lens system set forth in U.S. Pat. No. 7,184,225, comprising, in order from an object side to an image side: a first lens element with positive refractive power, a second lens element with positive refractive power and a third lens element with negative refractive power.

However, as the improved process technology and the trend of electronic products with compact appearance, the pixel size of sensors is getting smaller, and the demand for lens element featuring better image quality increases. Therefore, a conventional lens system with three lens elements can no longer satisfy photographing optical systems of even higher level.

A conventional compact imaging lens system equipped on a portable electronic product, such as the one set forth in U.S. Pat. No. 7,365,920, generally has a front stop and four lens elements; wherein the first and second lens elements are adhered together to form a doublet for correcting the chromatic aberration. However, this kind of arrangement has the following disadvantages. First, the degree of freedom in arranging the lens system is curtailed due to the employment of excessive number of spherical glass lenses; thus, the total track length of the system cannot be reduced easily. Second, the process of adhering glass lenses together is complicated, posing difficulties in manufacturing. Moreover, as the size of imaging lens systems is becoming smaller and the specification thereof is becoming higher, assembling lens elements compactly within a limited space tend to cause unwanted light rays to reflect too many times within a lens barrel, which will affect image quality. Thus, in order to improve image quality, it would be beneficial to bar the unwanted light rays from entering the image forming area.

Inasmuch as the foregoing, a need exists in the art for a photographing optical system that features better image quality and is compact while maintaining a moderate total track length.

SUMMARY OF THE INVENTION

The present invention provides a photographing optical system comprising, in order from an object side to an image side: a first lens element with positive refractive power having a convex object-side surface and a concave image-side surface; a second lens element with negative refractive power; a third lens element with positive refractive power having a concave object-side surface and a convex image-side surface; and a fourth lens element with negative refractive power having a concave image-side surface, and both the object-side and image-side surfaces thereof being aspheric; wherein there are four lens elements with refractive power; a radius of curvature of the image-side surface of the fourth lens element is R8, a radius of curvature of the object-side surface of the fourth lens element is R7, an on-axis spacing between the first lens element and the second lens element is T12, an on-axis spacing between the second lens element and the third lens element is T23, a radius of curvature of the object-side surface of the third lens element is R5, a radius of curvature of the image-side surface of the third lens element is R6, the photographing optical system also comprises an aperture stop, a distance on an optical axis between the aperture stop and an image plane is SL, a distance on the optical axis between the object-side surface of the first lens element and the image plane is TTL, and they satisfy the following relations: $|R8/R7|<0.15$; $0.35<T12/T23<0.70$; $2.0<(R5+R6)/(R5-R6)<4.5$; and $0.7<SL/TTL<1.2$.

On the other hand, the present invention provides a photographing optical system comprising, in order from an object side to an image side: a first lens element with positive refractive power having a convex object-side surface and a concave image-side surface; a second lens element with negative refractive power having a concave object-side surface and a concave image-side surface; a third lens element with positive refractive power having a concave object-side surface and a convex image-side surface; and a fourth lens element with negative refractive power having a concave image-side surface, and both the object-side and image-side surfaces thereof being aspheric; wherein there are four lens elements with refractive power; a radius of curvature of the object-side surface of the first lens element is R1, a radius of curvature of the image-side surface of the first lens element is R2, a maximal distance between an on-axis site on which the object-side surface of the fourth lens element projects and an on-axis vertex of the object-side surface of the fourth lens element is SAG41max, a maximal distance between an on-axis site on which the image-side surface of the fourth lens element projects and an on-axis vertex of the image-side surface of the fourth lens element is SAG42max, the photographing optical system also comprises an aperture stop, a distance on an optical axis between the aperture stop and an image plane is SL, a distance on the optical axis between the object-side surface of the first lens element and the image plane is TTL, and they satisfy the following relations: $-2.1<(R1+R2)/(R1-R2)<-1.2$; $-1.30<SAG41max/SAG42max<-0.45$; and $0.7<SL/TTL<1.2$.

By such arrangement, the total track length and photosensitivity of the photographing optical system can be effectively reduced, and high image resolution can be obtained.

In the aforementioned photographing optical system, the first lens element has positive refractive power, which thereby can provide partial refractive power for the system and is favorable for reducing the total track length thereof. The second lens element has negative refractive power, and thereby the aberration and the chromatic aberration can be effectively corrected. The third lens element has positive refractive power, which thereby can cooperate with the first lens element to reduce the sensitivity of the system. The fourth lens element has negative refractive power, which thereby can provide partial negative refractive power for the system so that the high order aberration of the system can be effectively corrected.

In the aforementioned photographing optical system, when the first lens element has a convex object-side surface and a concave image-side surface, the astigmatism of the system can be corrected favorably so that the image resolution of the system can be favorably improved. When the second lens element has a concave object-side surface and a concave image-side surface, along with the negative refractive power thereof, the chromatic aberration can be favorably corrected. When the third lens element has a concave object-side surface and a convex image-side surface, the astigmatism and high order aberration of the system can be favorably corrected. When the fourth lens element has a concave image-side surface, the principal point of the optical system can be positioned away from the image plane and thereby reducing the total optical track length of the system for keeping the lens compact.

BRIEF DESCRIPTION OF THE DRAWINGS

FIG. 8 is TABLE 1 which lists the optical data of the first embodiment.

FIG. 9 is TABLE 2 which lists the aspheric surface data of the first embodiment.

FIG. 10 is TABLE 3 which lists the optical data of the second embodiment.

FIG. 11 is TABLE 4 which lists the aspheric surface data of the second embodiment.

FIG. 12 is TABLE 5 which lists the optical data of the third embodiment.

FIG. 13 is TABLE 6 which lists the aspheric surface data of the third embodiment.

FIG. 14 is TABLE 7 which lists the optical data of the fourth embodiment.

FIG. 15 is TABLE 8 which lists the aspheric surface data of the fourth embodiment.

FIG. 16 is TABLE 9 which lists the optical data of the fifth embodiment.

FIG. 17 is TABLE 10 which lists the aspheric surface data of the fifth embodiment.

FIG. 18 is TABLE 11 which lists the optical data of the sixth embodiment.

FIG. 19 is TABLE 12 which lists the aspheric surface data of the sixth embodiment.

FIG. 20 is TABLE 13 which lists the optical data of the seventh embodiment.

FIG. 21 is TABLE 14 which lists the aspheric surface data of the seventh embodiment.

FIG. 22 is TABLE 15 which lists the data of the respective embodiments resulting from the equations.

DETAILED DESCRIPTION OF THE PREFERRED EMBODIMENTS

Figure 1A:
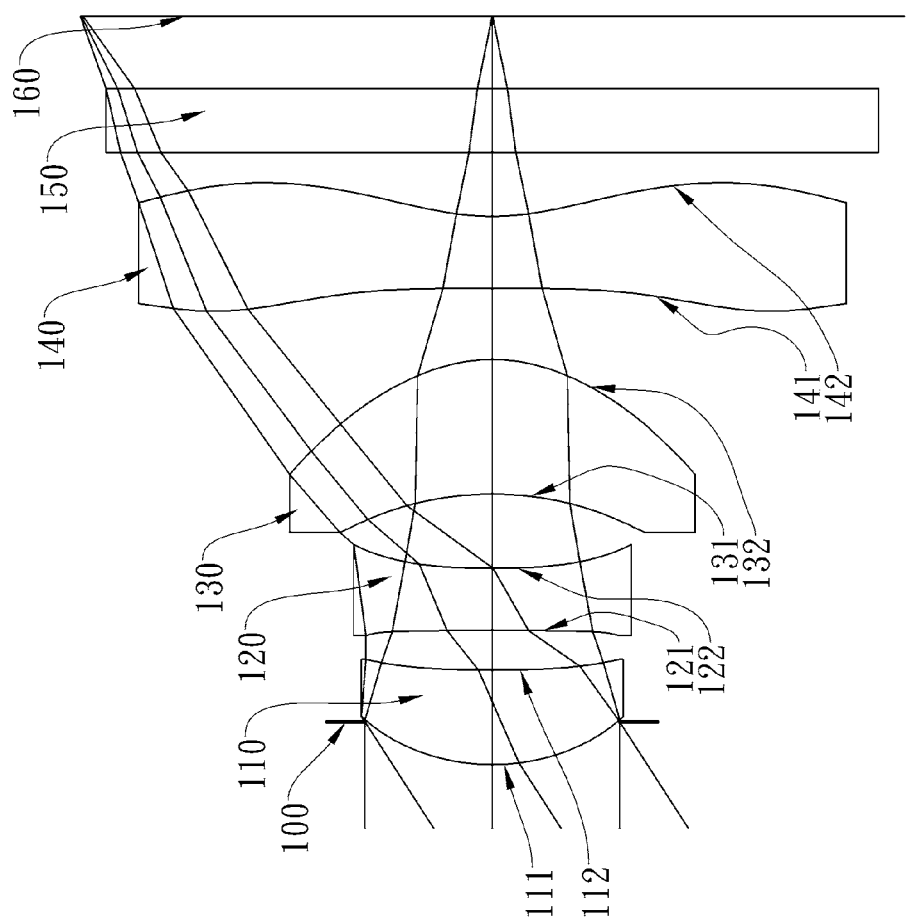
FIG. 1A shows a photographing optical system in accordance with a first embodiment of the present invention.

The present invention provides a photographing optical system comprising, in order from an object side to an image side: a first lens element with positive refractive power having a convex object-side surface and a concave image-side surface; a second lens element with negative refractive power; a third lens element with positive refractive power having a concave object-side surface and a convex image-side surface; and a fourth lens element with negative refractive power having a concave image-side surface, and both the object-side and image-side surfaces thereof being aspheric; wherein there are four lens elements with refractive power; a radius of curvature of the image-side surface of the fourth lens element is R8, a radius of curvature of the object-side surface of the fourth lens element is R7, an on-axis spacing between the first lens element and the second lens element is T12, an on-axis spacing between the second lens element and the third lens element is T23, a radius of curvature of the object-side surface of the third lens element is R5, a radius of curvature of the image-side surface of the third lens element is R6; the photographing optical system also comprises an aperture stop, a distance on an optical axis between the aperture stop and an image plane is SL, a distance on the optical axis between the object-side surface of the first lens element and the image plane is TTL, and they satisfy the following relations: |R8/R7|<0.15; 0.35<T12/T23<0.70; 2.0<(R5+R6)/(R5−R6)<4.5; and 0.7<SL/TTL<1.2.

When the relation of |R8/R7|<0.15 is satisfied, the curvature of the fourth lens element is not excessively large, which is good for correcting the aberration of the system; preferably, the following relation is satisfied: |R8/R7|<0.08.

When the relation of 0.35<T12/T23<0.70 is satisfied, the arrangement of the second lens element is more suitable, as it is beneficial in manufacturing the lens system and keeping an appropriate total track length.

When the relation of 2.0<(R5+R6)/(R5−R6)<4.5 is satisfied, the curvature of the third lens element is not excessively large, which is good for providing appropriate astigmatism correction for the system.

When SL/TTL is lower than 0.7, the angle at which light projects onto an image sensing unit may be too large, and thereby the drawbacks of adverse photosensitivity and excessive chromatic aberration may be occurred; when SL/TTL is higher than 1.2, the total track length may be too long and the sensitivity of the system may be increased so that raises the level of difficulty in manufacturing the lens elements. Thus, when the relation of 0.7<SL/TTL<1.2 is satisfied, the best balance between telecentricity and wide field of view can be achieved; preferably, when the relation of 0.9<SL/TTL<1.1 is satisfied, the position of the aperture stop is favorable for effectively reducing the total optical track length and achieving telecentricity.

In the aforementioned photographing optical system, preferably, at least one inflection point is formed on at least one of the object-side and image-side surfaces of the fourth lens element, and thereby the angle at which light projects onto the sensor from the off-axis field can be effectively reduced, and the off-axis aberrations can be further corrected.

In the aforementioned photographing optical system, a focal length of the third lens element is f3, a focal length of the second lens element is f2, and they preferably satisfy the following relation: −0.7<f3/f2<−0.1. When the above relation is satisfied, the refractive power of the second lens element and the third lens element is more appropriate, and thereby the aberration and astigmatism of the system can be effectively corrected; more preferably, the following relation is satisfied: −0.6<f3/f2<−0.3.

In the aforementioned photographing optical system, a radius of curvature of the object-side surface of the first lens element is R1, a radius of curvature of the image-side surface of the first lens element is R2, and they preferably satisfy the following relation: −2.1<(R1+R2)/(R1−R2)<−1.2. When the above relation is satisfied, it is favorable for correcting the spherical aberration of the system effectively.

In the aforementioned photographing optical system, the on-axis spacing between the second lens element and the third lens element is T23, an on-axis spacing between the third lens element and the fourth lens element is T34, and they preferably satisfy the following relation: 0.7<T23/T34<1.3. When the above relation is satisfied, the arrangement of the third lens element is more suitable for the manufacturing of the lens system and keeping an appropriate total optical track length thereof.

In the aforementioned photographing optical system, a radius of curvature of the object-side surface of the second lens element is R3, a radius of curvature of the image-side surface of the second lens element is R4, and they preferably satisfy the following relation: 0.30<(R3+R4)/(R3−R4)<0.65. When the above relation is satisfied, the curvature of the second lens element is more suitable, and thereby the aberration of the system can be favorably corrected.

In the aforementioned photographing optical system, an Abbe number of the first lens element is V1, an Abbe number of the second lens element is V2, and they preferably satisfy the following relation: 30<V1−V2<42. When the above relation is satisfied, it is favorable for correcting the chromatic aberration of the photographing optical system.

In the aforementioned photographing optical system, a thickness of the fourth lens element on the optical axis is CT4, a focal length of the photographing optical system is f, and they preferably satisfy the following relation: 0.05<CT4/f<0.15. When the above relation is satisfied, the thickness of the fourth lens element is more suitable for the manufacturing of the lens system and reducing the total optical track length thereof.

In the aforementioned photographing optical system, a maximal distance between an on-axis site on which the object-side surface of the fourth lens element projects and an on-axis vertex of the object-side surface of the fourth lens element is SAG41max, a maximal distance between an on-axis site on which the image-side surface of the fourth lens element projects and an on-axis vertex of the image-side surface of the fourth lens element is SAG42max, and they preferably satisfy the following relation: −1.30<SAG41max/SAG42max<−0.45. When the above relation is satisfied, the shape of the fourth lens element is not excessively bent, which is beneficial for manufacture and formation processes of the lens elements as well as better space arrangement of the lens system to be even more compact.

In the aforementioned photographing optical system, an image sensing unit is further provided on the image plane; a distance on the optical axis between the object-side surface of the first lens element and the image plane is TTL, half of a diagonal length of an effective pixel area of the image sensing unit is ImgH, and they preferably satisfy the following relation: TTL/ImgH<1.95. When the above relation is satisfied, it is favorable for keeping the photographing optical system compact so that it is suitable to be installed in compact electronic products.

On the other hand, the present invention provides a photographing optical system comprising, in order from an object side to an image side: a first lens element with positive refractive power having a convex object-side surface and a concave image-side surface; a second lens element with negative refractive power having a concave object-side surface and a concave image-side surface; a third lens element with positive refractive power having a concave object-side surface and a convex image-side surface; and a fourth lens element with negative refractive power having a concave image-side surface, and both the object-side and image-side surfaces thereof being aspheric; wherein there are four lens elements with refractive power; a radius of curvature of the object-side surface of the first lens element is R1, a radius of curvature of the image-side surface of the first lens element is R2, a maximal distance between an on-axis site on which the object-side surface of the fourth lens element projects and an on-axis vertex of the object-side surface of the fourth lens element is SAG41max, a maximal distance between an on-axis site on which the image-side surface of the fourth lens element projects and an on-axis vertex of the image-side surface of the fourth lens element is SAG42max, the photographing optical system also comprises an aperture stop, a distance on an optical axis between the aperture stop and an image plane is SL, a distance on the optical axis between the object-side surface of the first lens element and the image plane is TTL, and they satisfy the following relations: −2.1<(R1+R2)/(R1−R2)<−1.2; −1.30<SAG41max/SAG42max<−0.45; and 0.7<SL/TTL<1.2.

When the relation of −2.1<(R1+R2)/(R1−R2)<−1.2 is satisfied, it is favorable for correcting the spherical aberration of the system effectively.

When the relation of −1.30<SAG41max/SAG42max<−0.45 is satisfied, the shape of the fourth lens element is not excessively bent, which is beneficial for manufacture and formation processes of lens elements as well as better space arrangement of the lens system to be even more compact.

When SL/TTL is lower than 0.7, the angle at which light projects onto an image sensing unit may be too large, and thereby the drawbacks of adverse photosensitivity and excessive chromatic aberration may be occurred; when SL/TTL is higher than 1.2, the total track length may be too long and the sensitivity of the system may increase, and thereby raises the level of difficulty in manufacturing the lens elements. Thus, when the relation of 0.7<SL/TTL<1.2 is satisfied, the best balance between telecentricity and wide field of view can be achieved; preferably, when the relation of 0.9<SL/TTL<1.1 is satisfied, the position of the aperture stop is favorable for effectively reducing the total optical track length and achieving telecentricity.

In the aforementioned photographing optical system, a height between an optical axis and a site on the object-side surface of the fourth lens element which has a maximal distance between a projective image of the object-side surface on he optical axis to the on-axis vertex thereof is Yp41; a height between an optical axis and a site on the image-side surface of the fourth lens element which has a maximal distance between a projective image of the image-side surface on the optical axis to the on-axis vertex thereof is Yp42, and they preferably satisfy the following relation: 1.0<Yp41/Yp42<1.6. When the above relation is satisfied, the shape of the fourth lens element is not excessively bent, which is beneficial for manufacture and formation processes of lens elements as well as better space arrangement of the lens system to be even more compact.

In the aforementioned photographing optical system, a focal length of the third lens element is f3, a focal length of the second lens element is f2, and they preferably satisfy the following relation: −0.6<f3/f2<−0.3. When the above relation is satisfied, the refractive power of the second lens element and the third lens element is more appropriate, and thereby the aberration and astigmatism of the system can be effectively corrected.

In the aforementioned photographing optical system, a radius of curvature of the image-side surface of the fourth lens element is R8, a radius of curvature of the object-side surface of the fourth lens element is R7, and they preferably satisfy the following relation: |R8/R7|<0.15. When the above relation is satisfied, the curvature of the fourth lens element is not excessively large, which is good for correcting the aberration of the system.

In the aforementioned photographing optical system, a thickness of the fourth lens element on the optical axis is CT4, a focal length of the photographing optical system is f, and they preferably satisfy the following relation: 0.05<CT4/f<0.15. When the above relation is satisfied, the thickness of the fourth lens element is more suitable, which is good for the manufacture of lens system and reducing the total optical track length thereof.

In the aforementioned photographing optical system, a radius of curvature of the object-side surface of the second lens element is R3, a radius of curvature of the image-side surface of the second lens element is R4, and they preferably satisfy the following relation: 0.30<(R3+R4)/(R3−R4)<0.65. When the above relation is satisfied, the curvature of the second lens element is more suitable, and thereby the aberration of the system can be favorably corrected.

In the aforementioned photographing optical system, the lens elements can be made of glass or plastic material. If the lens elements are made of glass, the freedom for distributing the refractive power of the photographing optical system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the photographing optical system can be effectively reduced.

In the present photographing optical system, if a lens element is described to have a convex surface, it means the portion of the surface in proximity to the optical axis is convex; if a lens element is described to have a concave surface, it means the portion of the surface in proximity to the optical axis is concave.

In the present photographing optical system, there can be at least one field stop provided for eliminating stray light and thereby promoting image resolution thereof.

Figure 23:
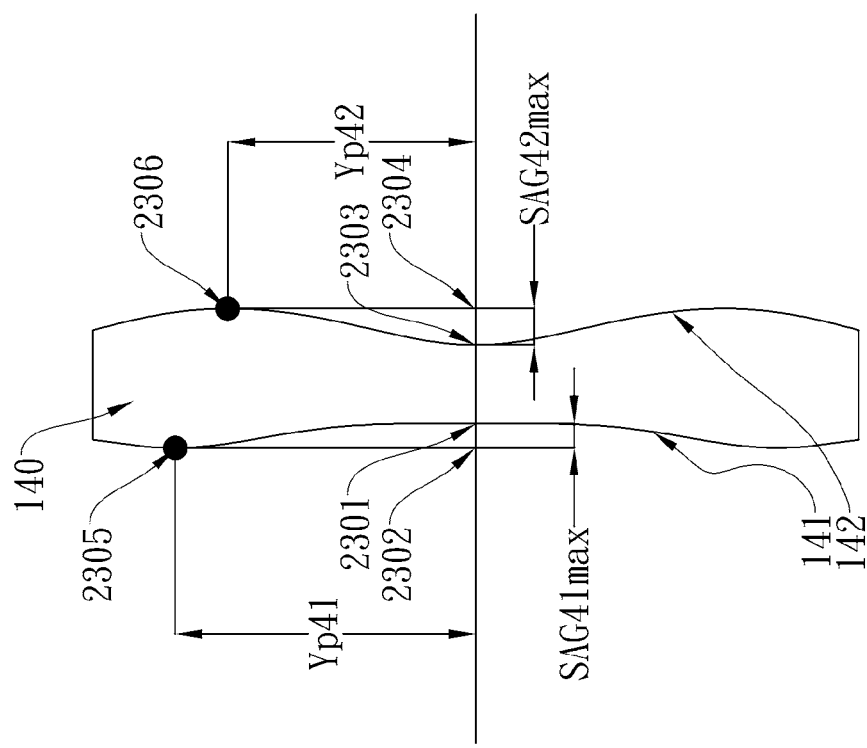
FIG. 23 shows the distance and relative positions represented by SAG41max, SAG42max, Yp41 and Yp42.

Please refer to FIG. 23, which shows the distance and relative positions represented by SAG41max, SAG42max, Yp41 and Yp42 of the present photographing optical system. FIG. 23 is an enlarged drawing of a fourth lens element of the first embodiment of the present invention (which will be described in more details below). A maximal distance between an on-axis site 2302 on which the object-side surface 141 of the fourth lens element 140 projects and an on-axis vertex 2301 of the object-side surface 141 is SAG41max, a maximal distance between an on-axis site 2304 on which the image-side surface 142 of the fourth lens element 140 projects and an on-axis vertex 2303 of the image-side surface 142 is SAG42max. A height between an optical axis and a site 2305 on the object-side surface 141 of the fourth lens element 140 which has a maximal distance between a projective image of the object-side surface 141 on the optical axis to the on-axis vertex 2301 thereof is Yp41, a height between an optical axis and a site 2306 on the image-side surface 142 of the fourth lens element 140 which has a maximal distance between a projective image of the image-side surface 142 on the optical axis to the on-axis vertex 2303 thereof is Yp42

Preferred embodiments of the present invention will be described in the following paragraphs by referring to the accompanying drawings.

Embodiment 1

Figure 1B:
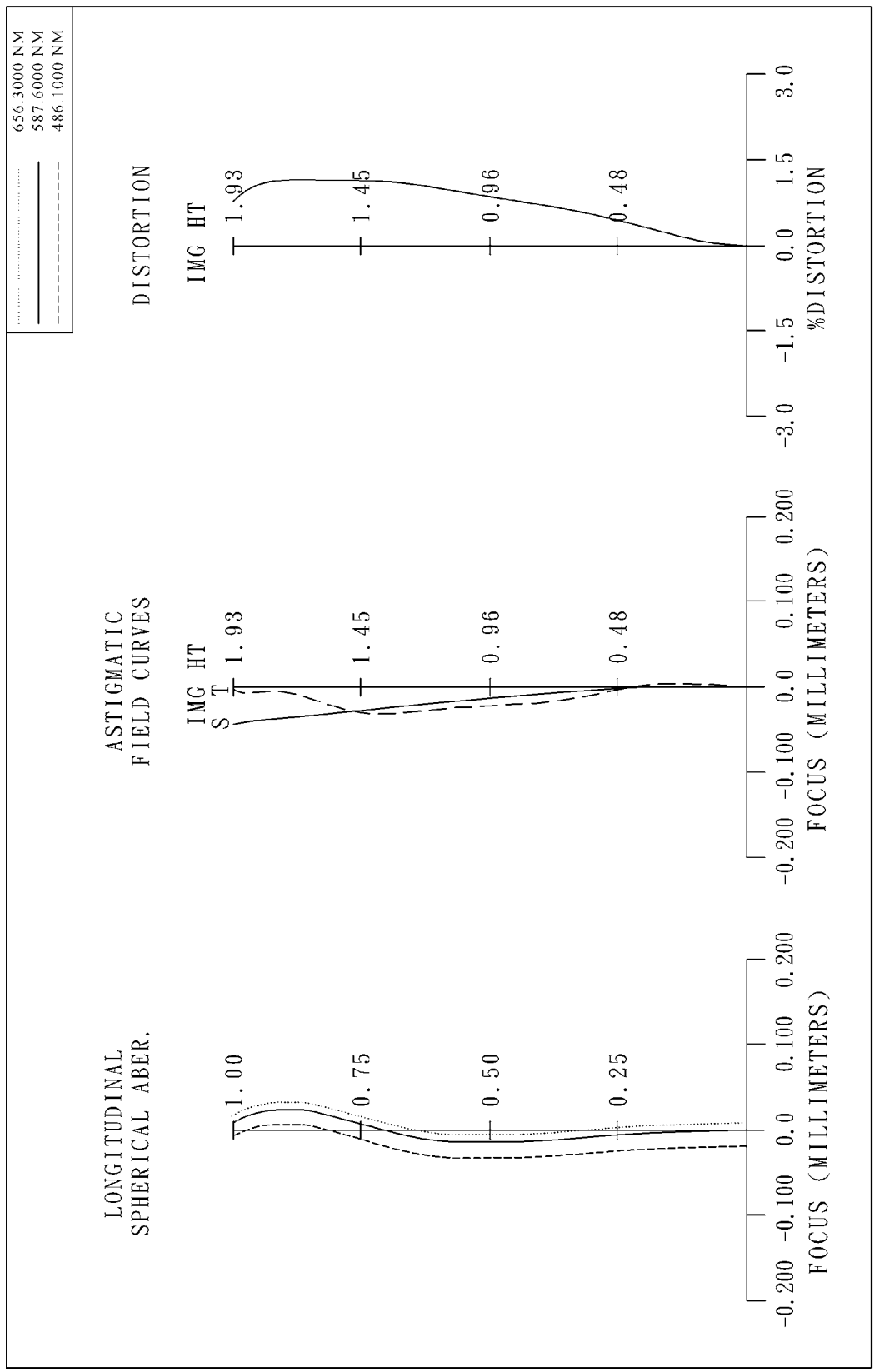
FIG. 1B shows the aberration curves of the first embodiment of the present invention.

FIG. 1A shows a photographing optical system in accordance with the first embodiment of the present invention, and FIG. 1B shows the aberration curves of the first embodiment of the present invention. The photographing optical system of the first embodiment of the present invention mainly comprises four lens elements, in order from an object side to an image side:

a plastic first lens element 110 with positive refractive power having a convex object-side surface 111 and a concave image-side surface 112, the object-side and image-side surfaces 111 and 112 thereof being aspheric;

a plastic second lens element 120 with negative refractive power having a concave object-side surface 121 and a concave image-side surface 122, the object-side and image-side surfaces 121 and 122 thereof being aspheric;

a plastic third lens element 130 with positive refractive power having a concave object-side surface 131 and a convex image-side surface 132, the object-side and image-side surfaces 131 and 132 thereof being aspheric; and a plastic fourth lens element 140 with negative refractive power having a convex object-side surface 141 and a concave image-side surface 142, the object-side and image-side surfaces 141 and 142 thereof being aspheric, and at least one inflection point is formed on both the object-side and image-side surfaces 141 and 142 thereof;

wherein an aperture stop 100 is disposed between an object and the first lens element 110;

the photographing optical system further comprises an IR filter 150 disposed between the image-side surface 142 of the fourth lens element 140 and an image plane 160, and the IR filter 150 is made of glass and has no influence on the focal length of the photographing optical system; the photographing optical system further comprises an image sensing unit provided on the image plane 160.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present photographing optical system, the focal length of the photographing optical system is f, and it satisfies the relation: f=2.98 (mm).

In the first embodiment of the present photographing optical system, the f-number of the photographing optical system is Fno, and it satisfies the relation: Fno=2.48.

In the first embodiment of the present photographing optical system, half of the maximal field of view of the photographing optical system is HFOV, and it satisfies the relation: HFOV=32.8 deg.

In the first embodiment of the present photographing optical system, the Abbe number of the first lens element 110 is V1, the Abbe number of the second lens element 120 is V2, and they satisfy the relation: V1−V2=32.1.

In the first embodiment of the present photographing optical system, the on-axis spacing between the first lens element 110 and the second lens element 120 is T12, the on-axis spacing between the second lens element 120 and the third lens element 130 is T23, and they satisfy the relation: T12/T23=0.54.

In the first embodiment of the present photographing optical system, the on-axis spacing between the second lens element 120 and the third lens element 130 is T23, the on-axis spacing between the third lens element 130 and the fourth lens element 140 is T34, and they satisfy the relation: T23/T34=1.05.

In the first embodiment of the present photographing optical system, the thickness of the fourth lens element 140 on the optical axis is CT4, a focal length of the photographing optical system is f, and they preferably satisfy the relation: CT4/f=0.11.

In the first embodiment of the present photographing optical system, the radius of curvature of the object-side surface 111 of the first lens element 110 is R1, the radius of curvature of the image-side surface 112 of the first lens element 110 is R2, and they satisfy the relation: (R1+R2)/(R1−R2)=−1.43.

In the first embodiment of the present photographing optical system, the radius of curvature of the object-side surface 121 of the second lens element 120 is R3, the radius of curvature of the image-side surface 122 of the second lens element 120 is R4, and they satisfy the relation: (R3+R4)/(R3−R4)=0.40.

In the first embodiment of the present photographing optical system, the radius of curvature of the object-side surface 131 of the third lens element 130 is R5, the radius of curvature of the image-side surface 132 of the third lens element 130 is R6, and they satisfy the relation: (R5+R6)/(R5−R6)=3.17.

In the first embodiment of the present photographing optical system, the radius of curvature of the image-side surface 142 of the fourth lens element 140 is R8, the radius of curvature of the object-side surface 141 of the fourth lens element 140 is R7, and they satisfy the relation: |R8/R7|=0.01.

In the first embodiment of the present photographing optical system, the focal length of the third lens element 130 is f3, the focal length of the second lens element 120 is f2, and they satisfy the relation: f3/f2=−0.51.

In the first embodiment of the present photographing optical system, a maximal distance between an on-axis site on which the object-side surface 141 of the fourth lens element 140 projects and an on-axis vertex of the object-side surface 141 is SAG41max, a maximal distance between an on-axis site on which the image-side surface 142 of the fourth lens element 140 projects and an on-axis vertex of the image-side surface 142 is SAG42max, and they satisfy the relation: SAG41max/SAG42max=−0.67.

In the first embodiment of the present photographing optical system, a height between an optical axis and a site on the object-side surface 141 of the fourth lens element 140 which has a maximal distance between a projective image of the object-side surface 141 on the optical axis to the on-axis vertex thereof is Yp41; a height between an optical axis and a site on the image-side surface 142 of the fourth lens element 140 which has a maximal distance between a projective image of the image-side surface 142 on the optical axis to the on-axis vertex thereof is Yp42, and they satisfy the relation: Yp41/Yp42=1.22.

In the first embodiment of the present photographing optical system, the distance on the optical axis between the aperture stop 100 and the image sensing unit is SL, the distance on the optical axis between the object-side surface 111 of the first lens element 110 and the image sensing unit is TTL, and they satisfy the relation: SL/TTL=0.94.

In the first embodiment of the present photographing optical system, the distance on the optical axis between the object-side surface 111 of the first lens element 110 and the image sensing unit is TTL, half of the diagonal length of the effective pixel area of the image sensing unit is ImgH, and they preferably satisfy the relation: TTL/ImgH=1.77.

The detailed optical data of the first embodiment is shown in FIG. 8 (TABLE 1), and the aspheric surface data is shown in FIG. 9 (TABLE 2), wherein the units of the radius of curvature, the thickness and the focal length are expressed in mm, and HFOV is half of the maximal field of view.

Embodiment 2

Figure 2A:
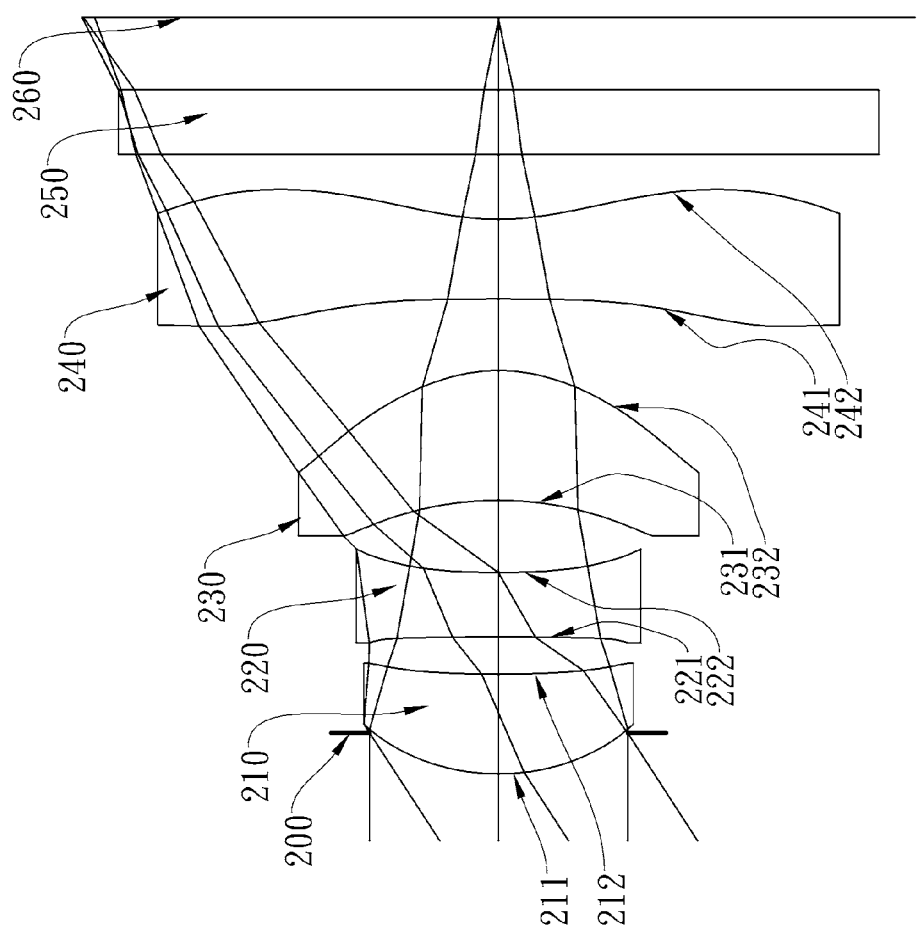
FIG. 2A shows a photographing optical system in accordance with a second embodiment of the present invention.
Figure 2B:
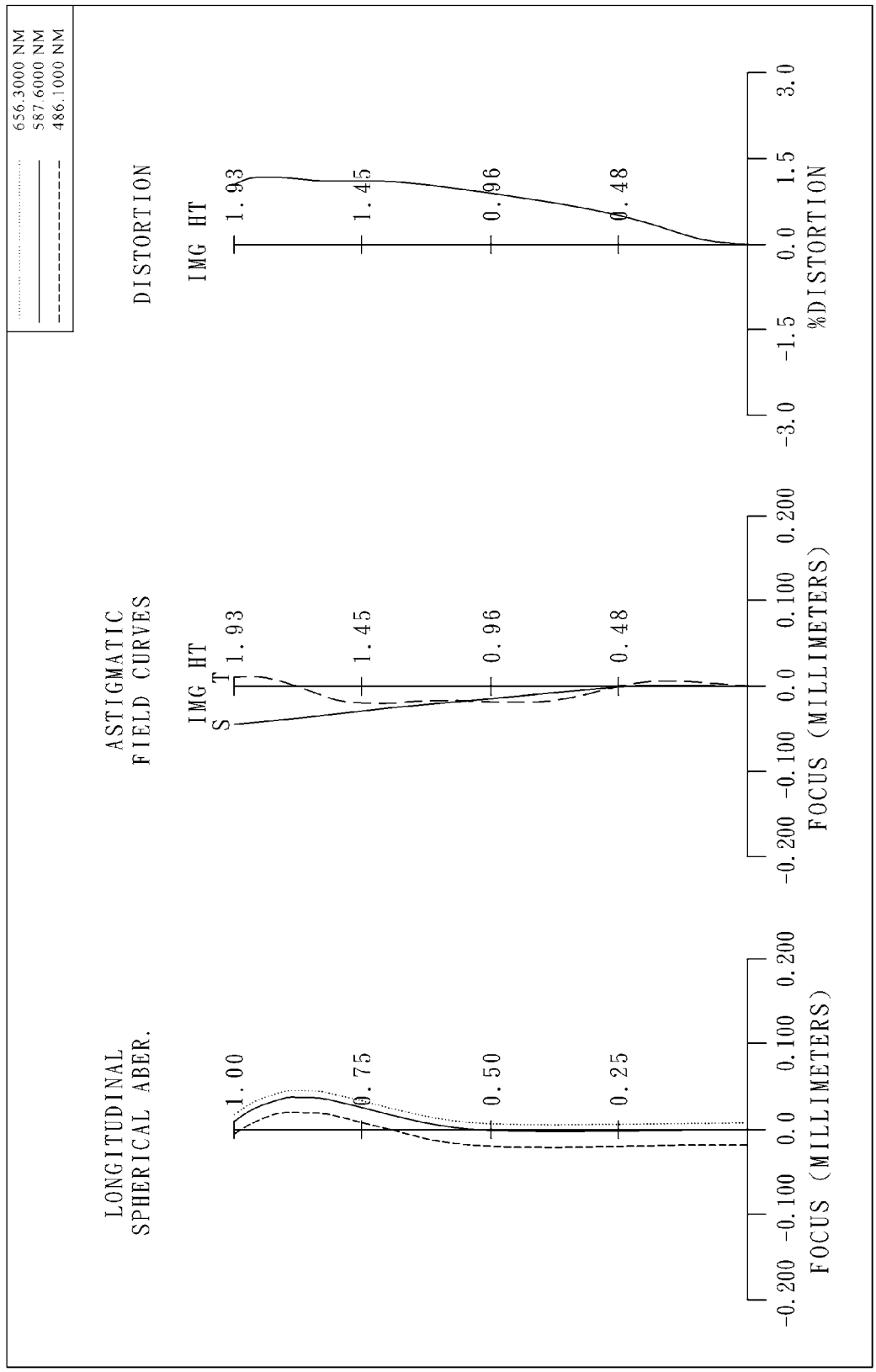
FIG. 2B shows the aberration curves of the second embodiment of the present invention.

FIG. 2A shows a photographing optical system in accordance with the second embodiment of the present invention, and FIG. 2B shows the aberration curves of the second embodiment of the present invention. The photographing optical system of the second embodiment of the present invention mainly comprises four lens elements, in order from an object side to an image side:

a plastic first lens element 210 with positive refractive power having a convex object-side surface 211 and a concave image-side surface 212, the object-side and image-side surfaces 211 and 212 thereof being aspheric;

a plastic second lens element 220 with negative refractive power having a concave object-side surface 221 and a concave image-side surface 222, the object-side and image-side surfaces 221 and 222 thereof being aspheric;

a plastic third lens element 230 with positive refractive power having a concave object-side surface 231 and a convex image-side surface 232, the object-side and image-side surfaces 231 and 232 thereof being aspheric; and a plastic fourth lens element 240 with negative refractive power having a concave object-side surface 241 and a concave image-side surface 242, the object-side and image-side surfaces 241 and 242 thereof being aspheric, and at least one inflection point is formed on both the object-side and image-side surfaces 241 and 242 thereof;

wherein an aperture stop 200 is disposed between an object and the first lens element 210;

the photographing optical system further comprises an IR filter 250 disposed between the image-side surface 242 of the fourth lens element 240 and an image plane 260, and the IR filter 250 is made of glass and has no influence on the focal length of the photographing optical system; the photographing optical system further comprises an image sensing unit provided on the image plane 260.

The equation of the aspheric surface profiles of the second embodiment has the same form as that of the first embodiment.

In the second embodiment of the present photographing optical system, the focal length of the photographing optical system is f, and it satisfies the relation: f=2.96 (mm).

In the second embodiment of the present photographing optical system, the f-number of the photographing optical system is Fno, and it satisfies the relation: Fno=2.45.

In the second embodiment of the present photographing optical system, half of the maximal field of view of the photographing optical system is HFOV, and it satisfies the relation: HFOV=33.0 deg.

In the second embodiment of the present photographing optical system, the Abbe number of the first lens element 210 is V1, the Abbe number of the second lens element 220 is V2, and they satisfy the relation: V1−V2=32.1.

In the second embodiment of the present photographing optical system, the on-axis spacing between the first lens element 210 and the second lens element 220 is T12, the on-axis spacing between the second lens element 220 and the third lens element 230 is T23, and they satisfy the relation: T12/T23=0.52.

In the second embodiment of the present photographing optical system, the on-axis spacing between the second lens element 220 and the third lens element 230 is T23, the on-axis spacing between the third lens element 230 and the fourth lens element 240 is T34, and they satisfy the relation: T23/T34=1.01.

In the second embodiment of the present photographing optical system, the thickness of the fourth lens element 240 on the optical axis is CT4, a focal length of the photographing optical system is f, and they preferably satisfy the relation: CT4/f=0.13.

In the second embodiment of the present photographing optical system, the radius of curvature of the object-side surface 211 of the first lens element 210 is R1, the radius of curvature of the image-side surface 212 of the first lens element 210 is R2, and they satisfy the relation: (R1+R2)/(R1−R2)=−1.42.

In the second embodiment of the present photographing optical system, the radius of curvature of the object-side surface 221 of the second lens element 220 is R3, the radius of curvature of the image-side surface 222 of the second lens element 220 is R4, and they satisfy the relation: (R3+R4)/(R3−R4)=0.44.

In the second embodiment of the present photographing optical system, the radius of curvature of the object-side surface 231 of the third lens element 230 is R5, the radius of curvature of the image-side surface 232 of the third lens element 230 is R6, and they satisfy the relation: (R5+R6)/(R5−R6)=3.19.

In the second embodiment of the present photographing optical system, the radius of curvature of the image-side surface 242 of the fourth lens element 240 is R8, the radius of curvature of the object-side surface 241 of the fourth lens element 240 is R7, and they satisfy the relation: |R8/R7|=0.03.

In the second embodiment of the present photographing optical system, the focal length of the third lens element 230 is f3, the focal length of the second lens element 220 is f2, and they satisfy the relation: f3/f2=−0.52.

In the second embodiment of the present photographing optical system, a maximal distance between an on-axis site on which the object-side surface 241 of the fourth lens element 240 projects and an on-axis vertex of the object-side surface 241 is SAG41max, a maximal distance between an on-axis site on which the image-side surface 242 of the fourth lens element 240 projects and an on-axis vertex of the image-side surface 242 is SAG42max, and they satisfy the relation: SAG41max/SAG42max=−0.92.

In the second embodiment of the present photographing optical system, a height between an optical axis and a site on the object-side surface 241 of the fourth lens element 240 which has a maximal distance between a projective image of the object-side surface 241 on the optical axis to the on-axis vertex thereof is Yp41; a height between an optical axis and a site on the image-side surface 242 of the fourth lens element 240 which has a maximal distance between a projective image of the image-side surface 242 on the optical axis to the on-axis vertex thereof is Yp42, and they satisfy the relation: Yp41/Yp42=1.32.

In the second embodiment of the present photographing optical system, the distance on the optical axis between the aperture stop 200 and the image sensing unit is SL, the distance on the optical axis between the object-side surface 211 of the first lens element 210 and the image sensing unit is TTL, and they satisfy the relation: SL/TTL=0.94.

In the second embodiment of the present photographing optical system, the distance on the optical axis between the object-side surface 211 of the first lens element 210 and the image sensing unit is TTL, half of the diagonal length of the effective pixel area of the image sensing unit is ImgH, and they preferably satisfy the relation: TTL/ImgH=1.77.

The detailed optical data of the second embodiment is shown in FIG. 10 (TABLE 3), and the aspheric surface data is shown in FIG. 11 (TABLE 4), wherein the units of the radius of curvature, the thickness and the focal length are expressed in mm, and HFOV is half of the maximal field of view.

Embodiment 3

Figure 3A:
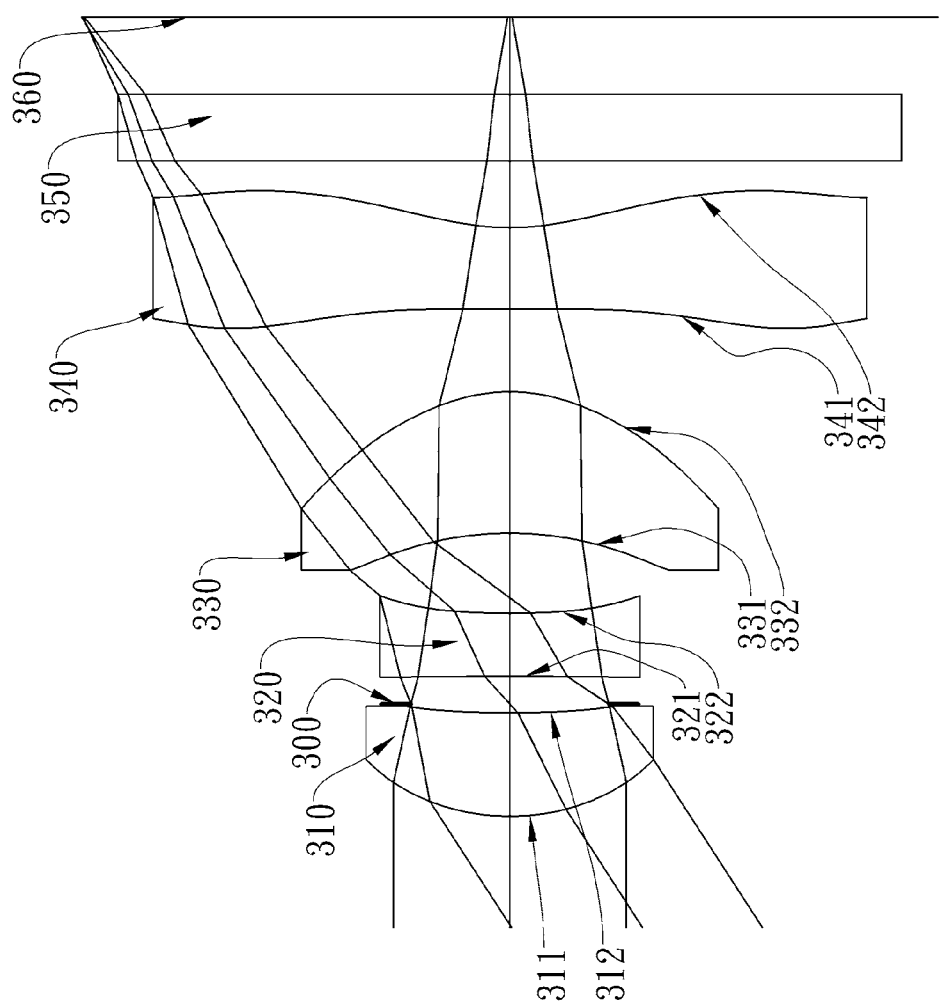
FIG. 3A shows a photographing optical system in accordance with a third embodiment of the present invention.
Figure 3B:
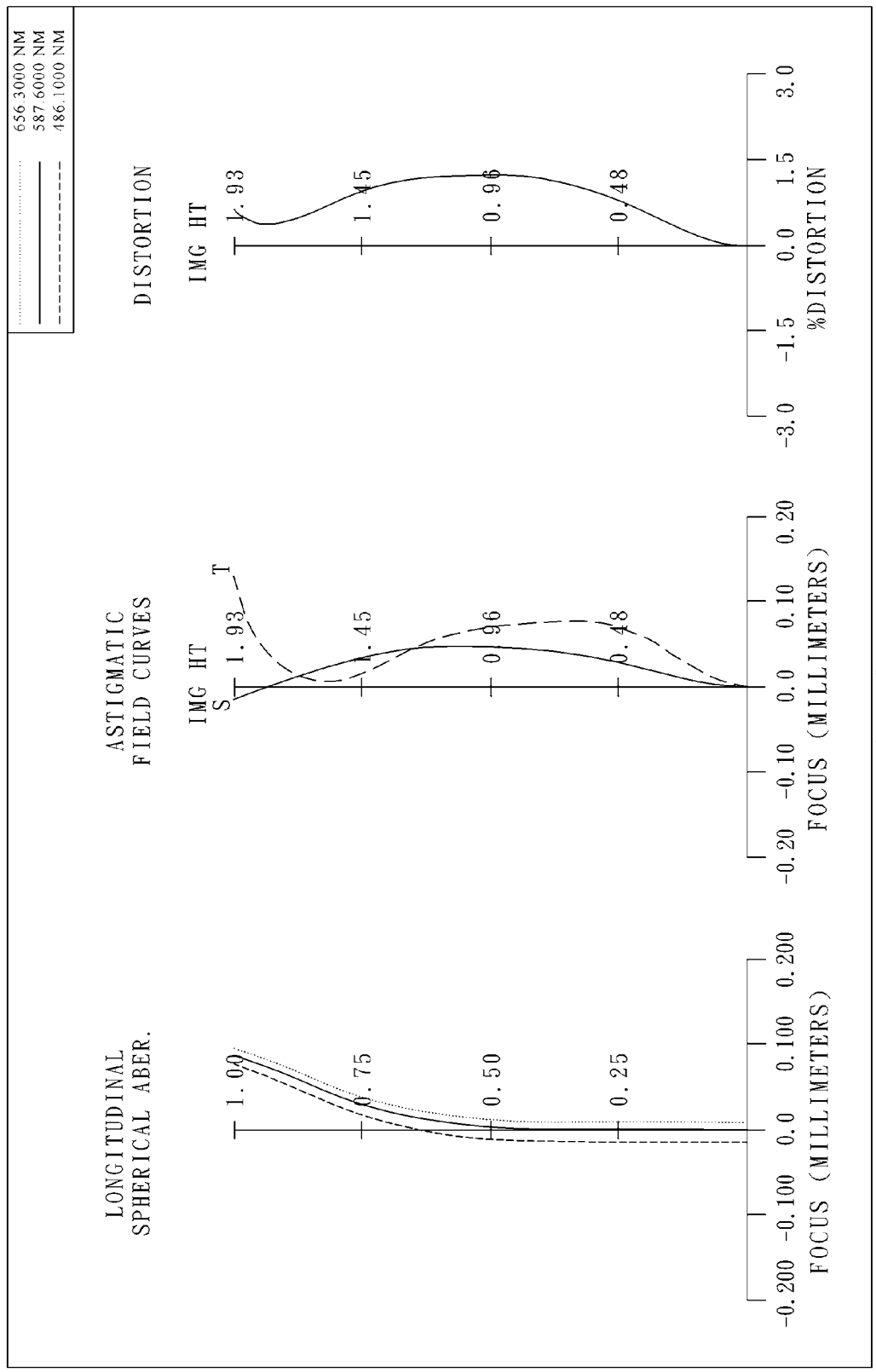
FIG. 3B shows the aberration curves of the third embodiment of the present invention.

FIG. 3A shows a photographing optical system in accordance with the third embodiment of the present invention, and FIG. 3B shows the aberration curves of the third embodiment of the present invention. The photographing optical system of the third embodiment of the present invention mainly comprises four lens elements, in order from an object side to an image side:

a plastic first lens element 310 with positive refractive power having a convex object-side surface 311 and a concave image-side surface 312, the object-side and image-side surfaces 311 and 312 thereof being aspheric;

a plastic second lens element 320 with negative refractive power having a concave object-side surface 321 and a concave image-side surface 322, the object-side and image-side surfaces 321 and 322 thereof being aspheric;

a plastic third lens element 330 with positive refractive power having a concave object-side surface 331 and a convex image-side surface 332, the object-side and image-side surfaces 331 and 332 thereof being aspheric; and a plastic fourth lens element 340 with negative refractive power having a convex object-side surface 341 and a concave image-side surface 342, the object-side and image-side surfaces 341 and 342 thereof being aspheric, and at least one inflection point is formed on both the object-side and image-side surfaces 341 and 342 thereof;

wherein an aperture stop 300 is disposed between the first lens element 310 and the second lens element 320;

the photographing optical system further comprises an IR filter 350 disposed between the image-side surface 342 of the fourth lens element 340 and an image plane 360, and the IR filter 350 is made of glass and has no influence on the focal length of the photographing optical system; the photographing optical system further comprises an image sensing unit provided on the image plane 360.

The equation of the aspheric surface profiles of the third embodiment has the same form as that of the first embodiment.

In the third embodiment of the present photographing optical system, the focal length of the photographing optical system is f, and it satisfies the relation: f=2.99 (mm).

In the third embodiment of the present photographing optical system, the f-number of the photographing optical system is Fno, and it satisfies the relation: Fno=2.80.

In the third embodiment of the present photographing optical system, half of the maximal field of view of the photographing optical system is HFOV, and it satisfies the relation: HFOV=32.9 deg.

In the third embodiment of the present photographing optical system, the Abbe number of the first lens element 310 is V1, the Abbe number of the second lens element 320 is V2, and they satisfy the relation: V1−V2=34.4.

In the third embodiment of the present photographing optical system, the on-axis spacing between the first lens element 310 and the second lens element 320 is T12, the on-axis spacing between the second lens element 320 and the third lens element 330 is T23, and they satisfy the relation: T12/T23=0.46.

In the third embodiment of the present photographing optical system, the on-axis spacing between the second lens element 320 and the third lens element 330 is T23, the on-axis spacing between the third lens element 330 and the fourth lens element 340 is T34, and they satisfy the relation: T23/T34=0.97.

In the third embodiment of the present photographing optical system, the thickness of the fourth lens element 340 on the optical axis is CT4, a focal length of the photographing optical system is f, and they preferably satisfy the relation: CT4/f=0.12.

In the third embodiment of the present photographing optical system, the radius of curvature of the object-side surface 311 of the first lens element 310 is R1, the radius of curvature of the image-side surface 312 of the first lens element 310 is R2, and they satisfy the relation: (R1+R2)/(R1−R2)=−1.51.

In the third embodiment of the present photographing optical system, the radius of curvature of the object-side surface 321 of the second lens element 320 is R3, the radius of curvature of the image-side surface 322 of the second lens element 320 is R4, and they satisfy the relation: (R3+R4)/(R3−R4)=0.52.

In the third embodiment of the present photographing optical system, the radius of curvature of the object-side surface 331 of the third lens element 330 is R5, the radius of curvature of the image-side surface 332 of the third lens element 330 is R6, and they satisfy the relation: (R5+R6)/(R5−R6)=3.13.

In the third embodiment of the present photographing optical system, the radius of curvature of the image-side surface 342 of the fourth lens element 340 is R8, the radius of curvature of the object-side surface 341 of the fourth lens element 340 is R7, and they satisfy the relation: |R8/R7|=0.03.

In the third embodiment of the present photographing optical system, the focal length of the third lens element 330 is f3, the focal length of the second lens element 320 is f2, and they satisfy the relation: f3/f2=−0.47.

In the third embodiment of the present photographing optical system, a maximal distance between an on-axis site on which the object-side surface 341 of the fourth lens element 340 projects and an on-axis vertex of the object-side surface 341 is SAG41max, a maximal distance between an on-axis site on which the image-side surface 342 of the fourth lens element 340 projects and an on-axis vertex of the image-side surface 342 is SAG42max, and they satisfy the relation: SAG41max/SAG42max=−0.52.

In the third embodiment of the present photographing optical system, a height between an optical axis and a site on the object-side surface 341 of the fourth lens element 340 which has a maximal distance between a projective image of the object-side surface 341 on the optical axis to the on-axis vertex thereof is Yp41; a height between an optical axis and a site on the image-side surface 342 of the fourth lens element 340 which has a maximal distance between a projective image of the image-side surface 342 on the optical axis to the on-axis vertex thereof is Yp42, and they satisfy the relation: Yp41/Yp42=1.11.

In the third embodiment of the present photographing optical system, the distance on the optical axis between the aperture stop 300 and the image sensing unit is SL, the distance on the optical axis between the object-side surface 311 of the first lens element 310 and the image sensing unit is TTL, and they satisfy the relation: SL/TTL=0.86.

In the third embodiment of the present photographing optical system, the distance on the optical axis between the object-side surface 311 of the first lens element 310 and the image sensing unit is TTL, half of the diagonal length of the effective pixel area of the image sensing unit is ImgH, and they preferably satisfy the relation: TTL/ImgH=1.82.

The detailed optical data of the third embodiment is shown in FIG. 12 (TABLE 5), and the aspheric surface data is shown in FIG. 13 (TABLE 6), wherein the units of the radius of curvature, the thickness and the focal length are expressed in mm, and HFOV is half of the maximal field of view.

Embodiment 4

Figure 4A:
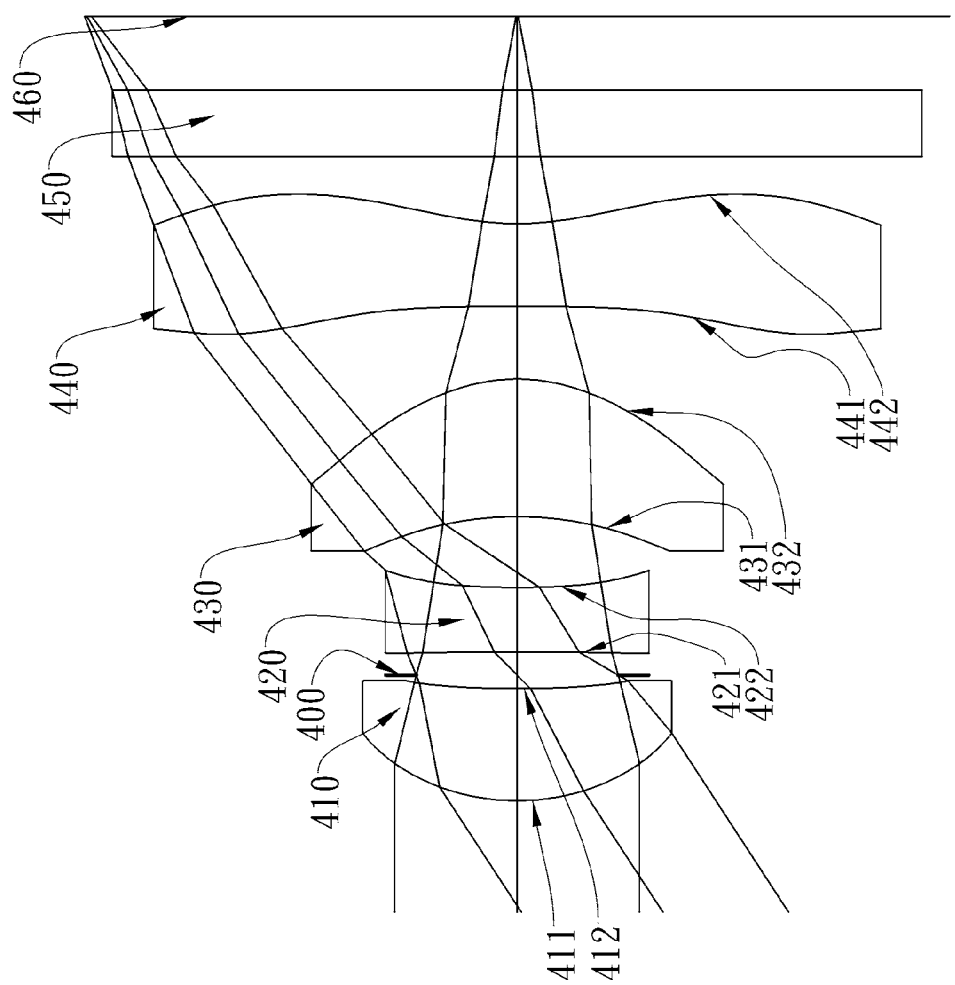
FIG. 4A shows a photographing optical system in accordance with a fourth embodiment of the present invention.
Figure 4B:
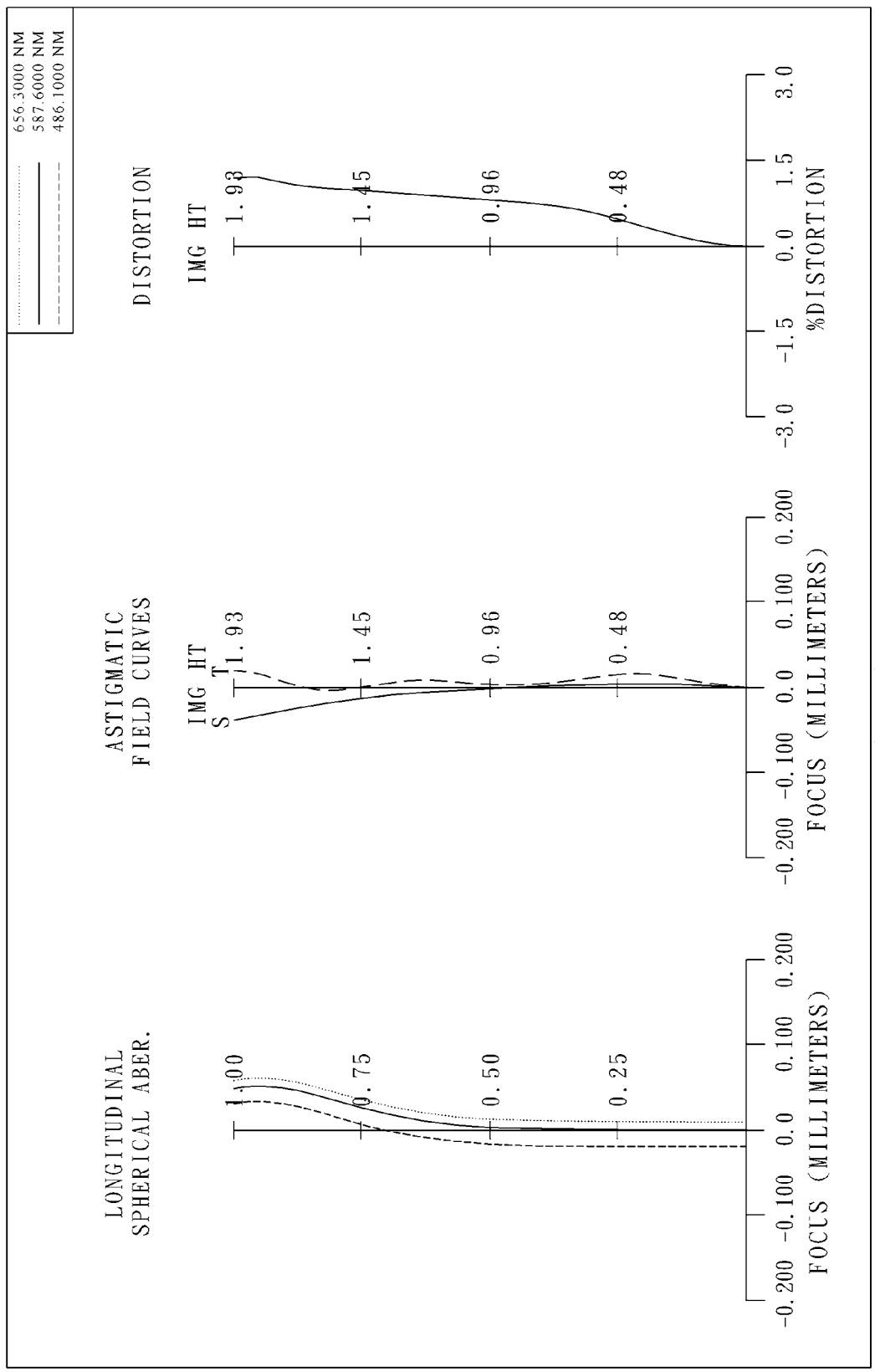
FIG. 4B shows the aberration curves of the fourth embodiment of the present invention.

FIG. 4A shows a photographing optical system in accordance with the fourth embodiment of the present invention, and FIG. 4B shows the aberration curves of the fourth embodiment of the present invention. The photographing optical system of the fourth embodiment of the present invention mainly comprises four lens elements, in order from an object side to an image side:

a plastic first lens element 410 with positive refractive power having a convex object-side surface 411 and a concave image-side surface 412, the object-side and image-side surfaces 411 and 412 thereof being aspheric;

a plastic second lens element 420 with negative refractive power having a concave object-side surface 421 and a concave image-side surface 422, the object-side and image-side surfaces 421 and 422 thereof being aspheric;

a plastic third lens element 430 with positive refractive power having a concave object-side surface 431 and a convex image-side surface 432, the object-side and image-side surfaces 431 and 432 thereof being aspheric; and a plastic fourth lens element 440 with negative refractive power having a concave object-side surface 441 and a concave image-side surface 442, the object-side and image-side surfaces 441 and 442 thereof being aspheric, and at least one inflection point is formed on both the object-side and image-side surfaces 441 and 442 thereof;

wherein an aperture stop 400 is disposed between the first lens element 410 and the second lens element 420;

the photographing optical system further comprises an IR filter 450 disposed between the image-side surface 442 of the fourth lens element 440 and an image plane 460, and the IR filter 450 is made of glass and has no influence on the focal length of the photographing optical system; the photographing optical system further comprises an image sensing unit provided on the image plane 460.

The equation of the aspheric surface profiles of the fourth embodiment has the same form as that of the first embodiment.

In the fourth embodiment of the present photographing optical system, the focal length of the photographing optical system is f, and it satisfies the relation: f=2.99 (mm).

In the fourth embodiment of the present photographing optical system, the f-number of the photographing optical system is Fno, and it satisfies the relation: Fno=2.80.

In the fourth embodiment of the present photographing optical system, half of the maximal field of view of the photographing optical system is HFOV, and it satisfies the relation: HFOV=32.9 deg.

In the fourth embodiment of the present photographing optical system, the Abbe number of the first lens element 410 is V1, the Abbe number of the second lens element 420 is V2, and they satisfy the relation: V1−V2=32.1.

In the fourth embodiment of the present photographing optical system, the on-axis spacing between the first lens element 410 and the second lens element 420 is T12, the on-axis spacing between the second lens element 420 and the third lens element 430 is T23, and they satisfy the relation: T12/T23=0.52.

In the fourth embodiment of the present photographing optical system, the on-axis spacing between the second lens element 420 and the third lens element 430 is T23, the on-axis spacing between the third lens element 430 and the fourth lens element 440 is T34, and they satisfy the relation: T23/T34=0.98.

In the fourth embodiment of the present photographing optical system, the thickness of the fourth lens element 440 on the optical axis is CT4, a focal length of the photographing optical system is f, and they preferably satisfy the relation: CT4/f=0.12.

In the fourth embodiment of the present photographing optical system, the radius of curvature of the object-side surface 411 of the first lens element 410 is R1, the radius of curvature of the image-side surface 412 of the first lens element 410 is R2, and they satisfy the relation: (R1+R2)/(R1−R2)=−1.47.

In the fourth embodiment of the present photographing optical system, the radius of curvature of the object-side surface 421 of the second lens element 420 is R3, the radius of curvature of the image-side surface 422 of the second lens element 420 is R4, and they satisfy the relation: (R3+R4)/(R3−R4)=0.50.

In the fourth embodiment of the present photographing optical system, the radius of curvature of the object-side surface 431 of the third lens element 430 is R5, the radius of curvature of the image-side surface 432 of the third lens element 430 is R6, and they satisfy the relation: (R5+R6)/(R5−R6)=3.19.

In the fourth embodiment of the present photographing optical system, the radius of curvature of the image-side surface 442 of the fourth lens element 440 is R8, the radius of curvature of the object-side surface 441 of the fourth lens element 440 is R7, and they satisfy the relation: |R8/R7|=0.02.

In the fourth embodiment of the present photographing optical system, the focal length of the third lens element 430 is f3, the focal length of the second lens element 420 is f2, and they satisfy the relation: f3/f2=−0.48.

In the fourth embodiment of the present photographing optical system, a maximal distance between an on-axis site on which the object-side surface 441 of the fourth lens element 440 projects and an on-axis vertex of the object-side surface 441 is SAG41max, a maximal distance between an on-axis site on which the image-side surface 442 of the fourth lens element 440 projects and an on-axis vertex of the image-side surface 442 is SAG42max, and they satisfy the relation: SAG41max/SAG42max=−0.95.

In the fourth embodiment of the present photographing optical system, a height between an optical axis and a site on the object-side surface 441 of the fourth lens element 440 which has a maximal distance between a projective image of the object-side surface 441 on the optical axis to the on-axis vertex thereof is Yp41; a height between an optical axis and a site on the image-side surface 442 of the fourth lens element 440 which has a maximal distance between a projective image of the image-side surface 442 on the optical axis to the on-axis vertex thereof is Yp42, and they satisfy the relation: Yp41/Yp42=1.33.

In the fourth embodiment of the present photographing optical system, the distance on the optical axis between the aperture stop 400 and the image sensing unit is SL, the distance on the optical axis between the object-side surface 411 of the first lens element 410 and the image sensing unit is TTL, and they satisfy the relation: SL/TTL=0.84.

In the fourth embodiment of the present photographing optical system, the distance on the optical axis between the object-side surface 411 of the first lens element 410 and the image sensing unit is TTL, half of the diagonal length of the effective pixel area of the image sensing unit is ImgH, and they preferably satisfy the relation: TTL/ImgH=1.77.

The detailed optical data of the fourth embodiment is shown in FIG. 14 (TABLE 7), and the aspheric surface data is shown in FIG. 15 (TABLE 8), wherein the units of the radius of curvature, the thickness and the focal length are expressed in mm, and HFOV is half of the maximal field of view.

Embodiment 5

Figure 5A:
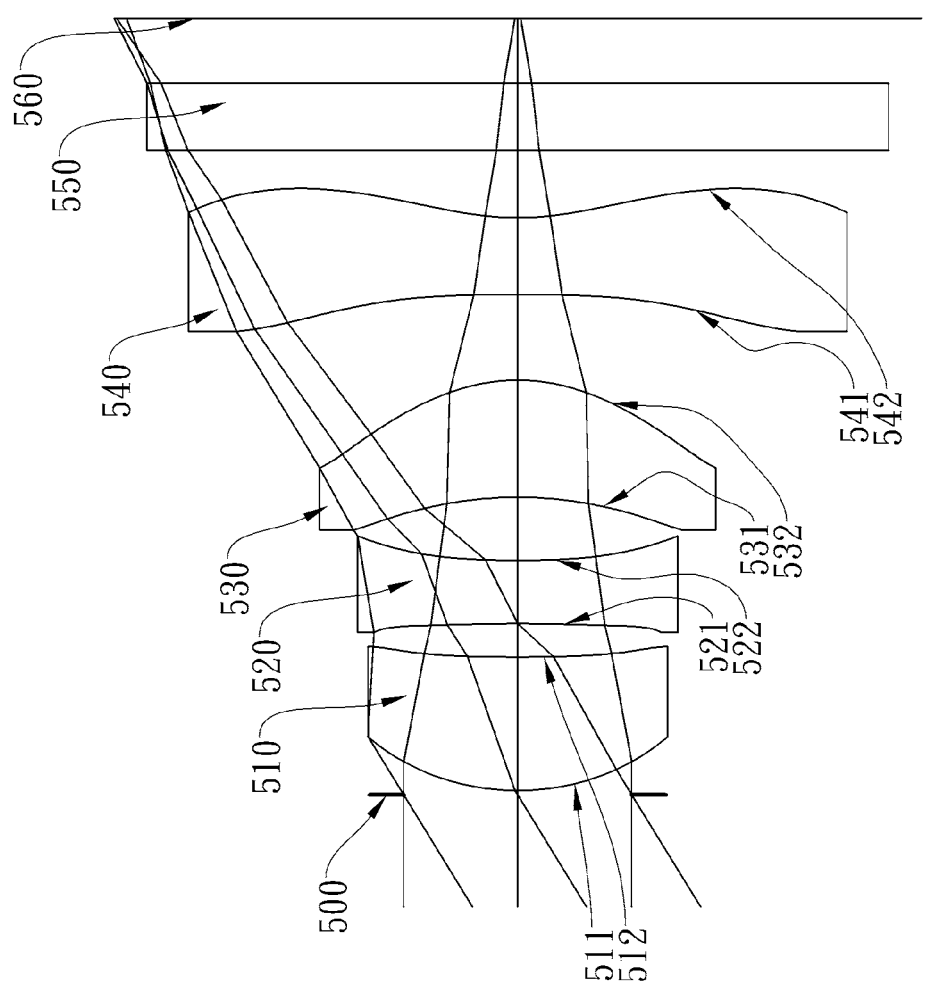
FIG. 5A shows a photographing optical system in accordance with a fifth embodiment of the present invention.
Figure 5B:
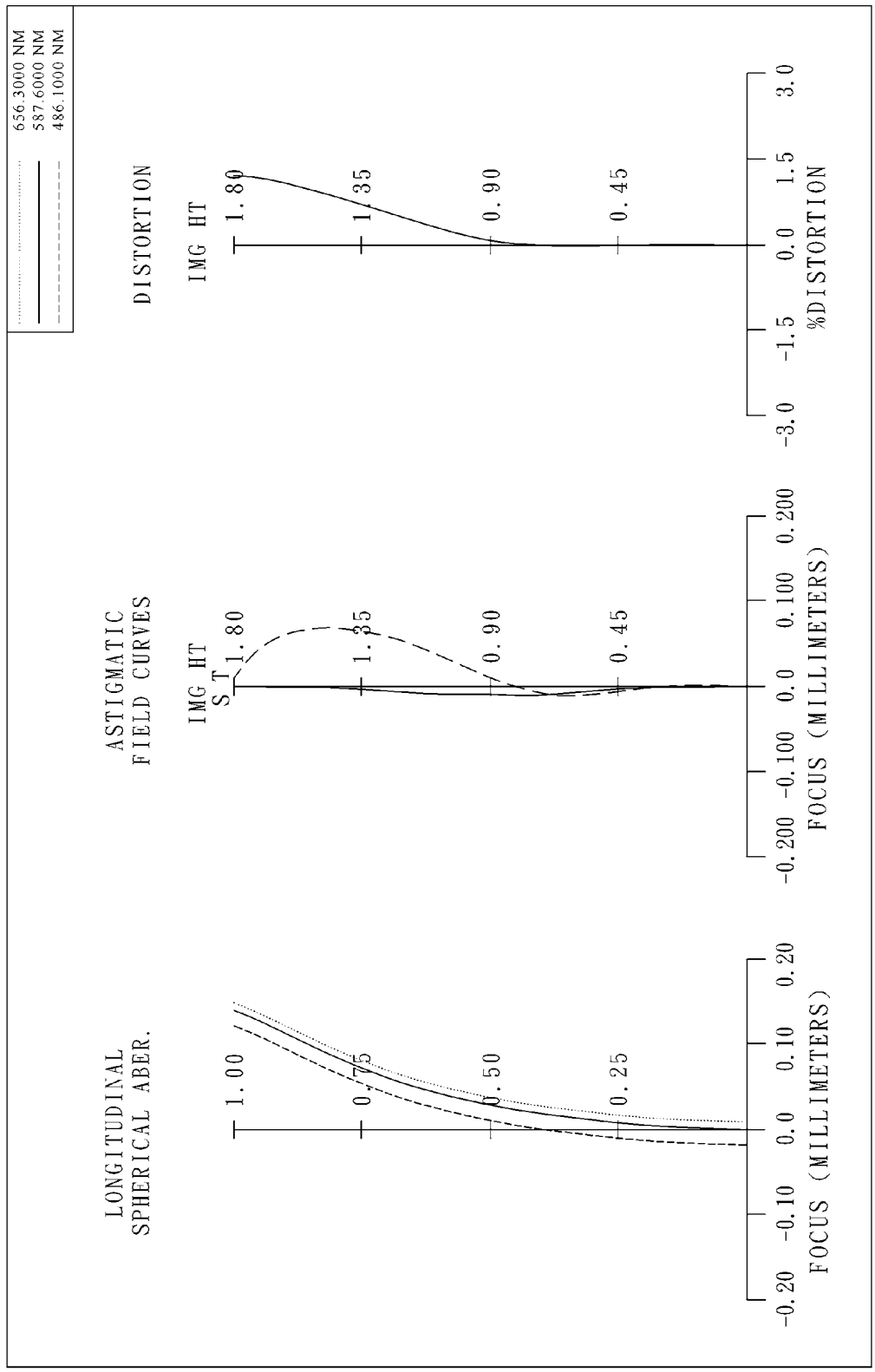
FIG. 5B shows the aberration curves of the fifth embodiment of the present invention.

FIG. 5A shows a photographing optical system in accordance with the fifth embodiment of the present invention, and FIG. 5B shows the aberration curves of the fifth embodiment of the present invention. The photographing optical system of the fifth embodiment of the present invention mainly comprises four lens elements, in order from an object side to an image side:

a plastic first lens element 510 with positive refractive power having a convex object-side surface 511 and a concave image-side surface 512, the object-side and image-side surfaces 511 and 512 thereof being aspheric;

a plastic second lens element 520 with negative refractive power having a concave object-side surface 521 and a concave image-side surface 522, the object-side and image-side surfaces 521 and 522 thereof being aspheric;

a plastic third lens element 530 with positive refractive power having a concave object-side surface 531 and a convex image-side surface 532, the object-side and image-side surfaces 531 and 532 thereof being aspheric; and a plastic fourth lens element 540 with negative refractive power having a concave object-side surface 541 and a concave image-side surface 542, the object-side and image-side surfaces 541 and 542 thereof being aspheric, and at least one inflection point is formed on both the object-side and image-side surfaces 541 and 542 thereof;

wherein an aperture stop 500 is disposed between an object and the first lens element 510;

the photographing optical system further comprises an IR filter 550 disposed between the image-side surface 542 of the fourth lens element 540 and an image plane 560, and the IR filter 550 is made of glass and has no influence on the focal length of the photographing optical system; the photographing optical system further comprises an image sensing unit provided on the image plane 560.

The equation of the aspheric surface profiles of the fifth embodiment has the same form as that of the first embodiment.

In the fifth embodiment of the present photographing optical system, the focal length of the photographing optical system is f, and it satisfies the relation: f=2.94 (mm).

In the fifth embodiment of the present photographing optical system, the f-number of the photographing optical system is Fno, and it satisfies the relation: Fno=2.80.

In the fifth embodiment of the present photographing optical system, half of the maximal field of view of the photographing optical system is HFOV, and it satisfies the relation: HFOV=31.5 deg.

In the fifth embodiment of the present photographing optical system, the Abbe number of the first lens element 510 is V1, the Abbe number of the second lens element 520 is V2, and they satisfy the relation: V1−V2=32.1.

In the fifth embodiment of the present photographing optical system, the on-axis spacing between the first lens element 510 and the second lens element 520 is T12, the on-axis spacing between the second lens element 520 and the third lens element 530 is T23, and they satisfy the relation: T12/T23=0.53.

In the fifth embodiment of the present photographing optical system, the on-axis spacing between the second lens element 520 and the third lens element 530 is T23, the on-axis spacing between the third lens element 530 and the fourth lens element 540 is T34, and they satisfy the relation: T23/T34=0.74.

In the fifth embodiment of the present photographing optical system, the thickness of the fourth lens element 540 on the optical axis is CT4, a focal length of the photographing optical system is f, and they preferably satisfy the relation: CT4/f=0.12.

In the fifth embodiment of the present photographing optical system, the radius of curvature of the object-side surface 511 of the first lens element 510 is R1, the radius of curvature of the image-side surface 512 of the first lens element 510 is R2, and they satisfy the relation: (R1+R2)/(R1−R2)=−1.28.

In the fifth embodiment of the present photographing optical system, the radius of curvature of the object-side surface 521 of the second lens element 520 is R3, the radius of curvature of the image-side surface 522 of the second lens element 520 is R4, and they satisfy the relation: (R3+R4)/(R3−R4)=0.15.

In the fifth embodiment of the present photographing optical system, the radius of curvature of the object-side surface 531 of the third lens element 530 is R5, the radius of curvature of the image-side surface 532 of the third lens element 530 is R6, and they satisfy the relation: (R5+R6)/(R5−R6)=2.78.

In the fifth embodiment of the present photographing optical system, the radius of curvature of the image-side surface 542 of the fourth lens element 540 is R8, the radius of curvature of the object-side surface 541 of the fourth lens element 540 is R7, and they satisfy the relation: |R8/R7|=0.12.

In the fifth embodiment of the present photographing optical system, the focal length of the third lens element 530 is f3, the focal length of the second lens element 520 is f2, and they satisfy the relation: f3/f2=−0.52.

In the fifth embodiment of the present photographing optical system, a maximal distance between an on-axis site on which the object-side surface 541 of the fourth lens element 540 projects and an on-axis vertex of the object-side surface 541 is SAG41max, a maximal distance between an on-axis site on which the image-side surface 542 of the fourth lens element 540 projects and an on-axis vertex of the image-side surface 542 is SAG42max, and they satisfy the relation: SAG41max/SAG42max=−1.27.

In the fifth embodiment of the present photographing optical system, a height between an optical axis and a site on the object-side surface 541 of the fourth lens element 540 which has a maximal distance between a projective image of the object-side surface 541 on the optical axis to the on-axis vertex thereof is Yp41; a height between an optical axis and a site on the image-side surface 542 of the fourth lens element 540 which has a maximal distance between a projective image of the image-side surface 542 on the optical axis to the on-axis vertex thereof is Yp42, and they satisfy the relation: Yp41/Yp42=1.29.

In the fifth embodiment of the present photographing optical system, the distance on the optical axis between the aperture stop 500 and the image sensing unit is SL, the distance on the optical axis between the object-side surface 511 of the first lens element 510 and the image sensing unit is TTL, and they satisfy the relation: SL/TTL=1.01.

In the fifth embodiment of the present photographing optical system, the distance on the optical axis between the object-side surface 511 of the first lens element 510 and the image sensing unit is TTL, half of the diagonal length of the effective pixel area of the image sensing unit is ImgH, and they preferably satisfy the relation: TTL/ImgH=1.86.

The detailed optical data of the fifth embodiment is shown in FIG. 16 (TABLE 9), and the aspheric surface data is shown in FIG. 17 (TABLE 10), wherein the units of the radius of curvature, the thickness and the focal length are expressed in mm, and HFOV is half of the maximal field of view.

Embodiment 6

Figure 6A:
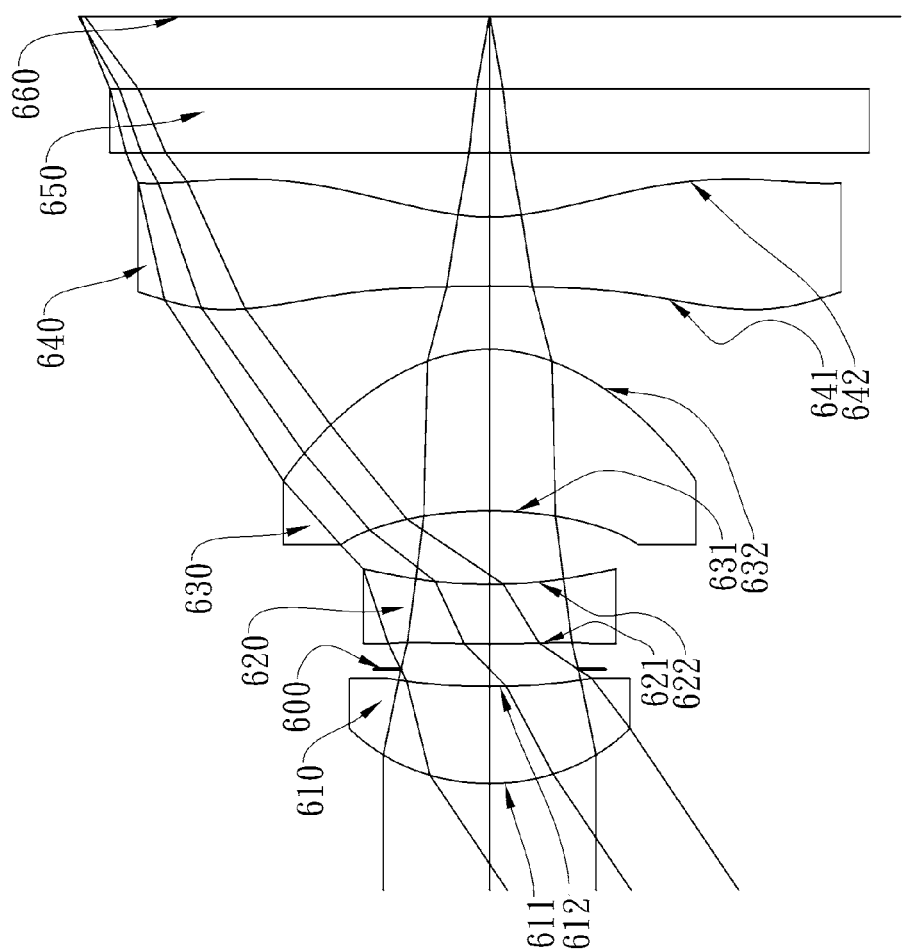
FIG. 6A shows a photographing optical system in accordance with a sixth embodiment of the present invention.
Figure 6B:
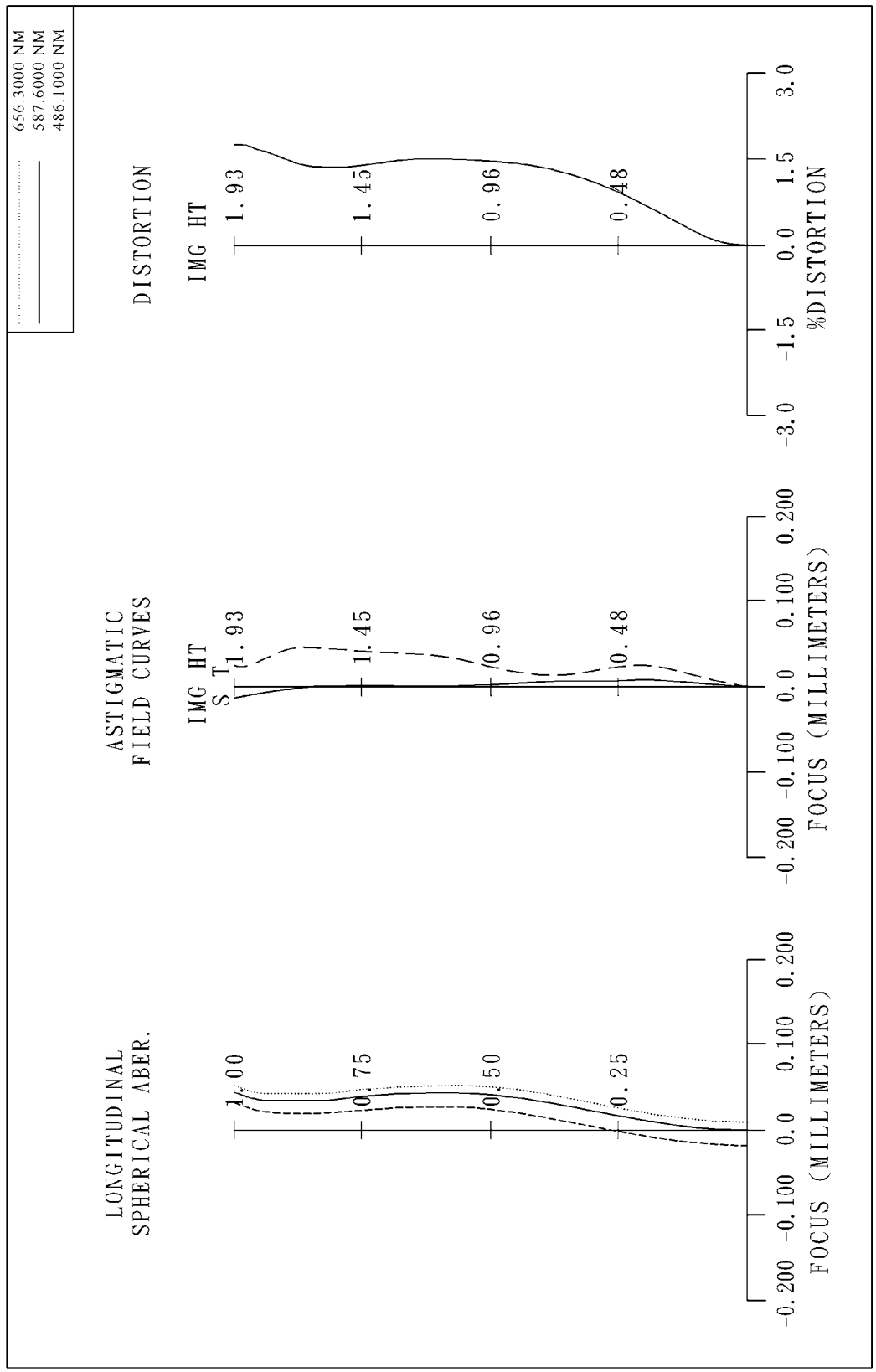
FIG. 6B shows the aberration curves of the sixth embodiment of the present invention.

FIG. 6A shows a photographing optical system in accordance with the sixth embodiment of the present invention, and FIG. 6B shows the aberration curves of the sixth embodiment of the present invention. The photographing optical system of the sixth embodiment of the present invention mainly comprises four lens elements, in order from an object side to an image side:

a plastic first lens element 610 with positive refractive power having a convex object-side surface 611 and a concave image-side surface 612, the object-side and image-side surfaces 611 and 612 thereof being aspheric;

a plastic second lens element 620 with negative refractive power having a convex object-side surface 621 and a concave image-side surface 622, the object-side and image-side surfaces 621 and 622 thereof being aspheric;

a plastic third lens element 630 with positive refractive power having a concave object-side surface 631 and a convex image-side surface 632, the object-side and image-side surfaces 631 and 632 thereof being aspheric; and a plastic fourth lens element 640 with negative refractive power having a concave object-side surface 641 and a concave image-side surface 642, the object-side and image-side surfaces 641 and 642 thereof being aspheric, and at least one inflection point is formed on both the object-side and image-side surfaces 641 and 642 thereof;

wherein an aperture stop 600 is disposed between the first lens element 610 and the second lens element 620;

the photographing optical system further comprises an IR filter 650 disposed between the image-side surface 642 of the fourth lens element 640 and an image plane 660, and the IR filter 650 is made of glass and has no influence on the focal length of the photographing optical system; the photographing optical system further comprises an image sensing unit provided on the image plane 660.

The equation of the aspheric surface profiles of the sixth embodiment has the same form as that of the first embodiment.

In the sixth embodiment of the present photographing optical system, the focal length of the photographing optical system is f, and it satisfies the relation: f=2.85 (mm).

In the sixth embodiment of the present photographing optical system, the f-number of the photographing optical system is Fno, and it satisfies the relation: Fno=2.80.

In the sixth embodiment of the present photographing optical system, half of the maximal field of view of the photographing optical system is HFOV, and it satisfies the relation: HFOV=33.9 deg.

In the sixth embodiment of the present photographing optical system, the Abbe number of the first lens element 610 is V1, the Abbe number of the second lens element 620 is V2, and they satisfy the relation: V1−V2=34.4.

In the sixth embodiment of the present photographing optical system, the on-axis spacing between the first lens element 610 and the second lens element 620 is T12, the on-axis spacing between the second lens element 620 and the third lens element 630 is T23, and they satisfy the relation: T12/T23=0.58.

In the sixth embodiment of the present photographing optical system, the on-axis spacing between the second lens element 620 and the third lens element 630 is T23, the on-axis spacing between the third lens element 630 and the fourth lens element 640 is T34, and they satisfy the relation: T23/T34=1.17.

In the sixth embodiment of the present photographing optical system, the thickness of the fourth lens element 640 on the optical axis is CT4, a focal length of the photographing optical system is f, and they preferably satisfy the relation: CT4/f=0.11.

In the sixth embodiment of the present photographing optical system, the radius of curvature of the object-side surface 611 of the first lens element 610 is R1, the radius of curvature of the image-side surface 612 of the first lens element 610 is R2, and they satisfy the relation: (R1+R2)/(R1−R2)=−1.91.

In the sixth embodiment of the present photographing optical system, the radius of curvature of the object-side surface 621 of the second lens element 620 is R3, the radius of curvature of the image-side surface 622 of the second lens element 620 is R4, and they satisfy the relation: (R3+R4)/(R3−R4)=2.06.

In the sixth embodiment of the present photographing optical system, the radius of curvature of the object-side surface 631 of the third lens element 630 is R5, the radius of curvature of the image-side surface 632 of the third lens element 630 is R6, and they satisfy the relation: (R5+R6)/(R5−R6)=2.11.

In the sixth embodiment of the present photographing optical system, the radius of curvature of the image-side surface 642 of the fourth lens element 640 is R8, the radius of curvature of the object-side surface 641 of the fourth lens element 640 is R7, and they satisfy the relation: |R8/R7|=0.05.

In the sixth embodiment of the present photographing optical system, the focal length of the third lens element 630 is f3, the focal length of the second lens element 620 is f2, and they satisfy the relation: f3/f2=−0.30.

In the sixth embodiment of the present photographing optical system, a maximal distance between an on-axis site on which the object-side surface 641 of the fourth lens element 640 projects and an on-axis vertex of the object-side surface 641 is SAG41max, a maximal distance between an on-axis site on which the image-side surface 642 of the fourth lens element 640 projects and an on-axis vertex of the image-side surface 642 is SAG42max, and they satisfy the relation: SAG41max/SAG42max=−0.61.

In the sixth embodiment of the present photographing optical system, a height between an optical axis and a site on the object-side surface 641 of the fourth lens element 640 which has a maximal distance between a projective image of the object-side surface 641 on the optical axis to the on-axis vertex thereof is Yp41; a height between an optical axis and a site on the image-side surface 642 of the fourth lens element 640 which has a maximal distance between a projective image of the image-side surface 642 on the optical axis to the on-axis vertex thereof is Yp42, and they satisfy the relation: Yp41/Yp42=1.07.

In the sixth embodiment of the present photographing optical system, the distance on the optical axis between the aperture stop 600 and the image sensing unit is SL, the distance on the optical axis between the object-side surface 611 of the first lens element 610 and the image sensing unit is TTL, and they satisfy the relation: SL/TTL=0.85.

In the sixth embodiment of the present photographing optical system, the distance on the optical axis between the object-side surface 611 of the first lens element 610 and the image sensing unit is TTL, half of the diagonal length of the effective pixel area of the image sensing unit is ImgH, and they preferably satisfy the relation: TTL/ImgH=1.82.

The detailed optical data of the sixth embodiment is shown in FIG. 18 (TABLE 11), and the aspheric surface data is shown in FIG. 19 (TABLE 12), wherein the units of the radius of curvature, the thickness and the focal length are expressed in mm, and HFOV is half of the maximal field of view.

Embodiment 7

Figure 7A:
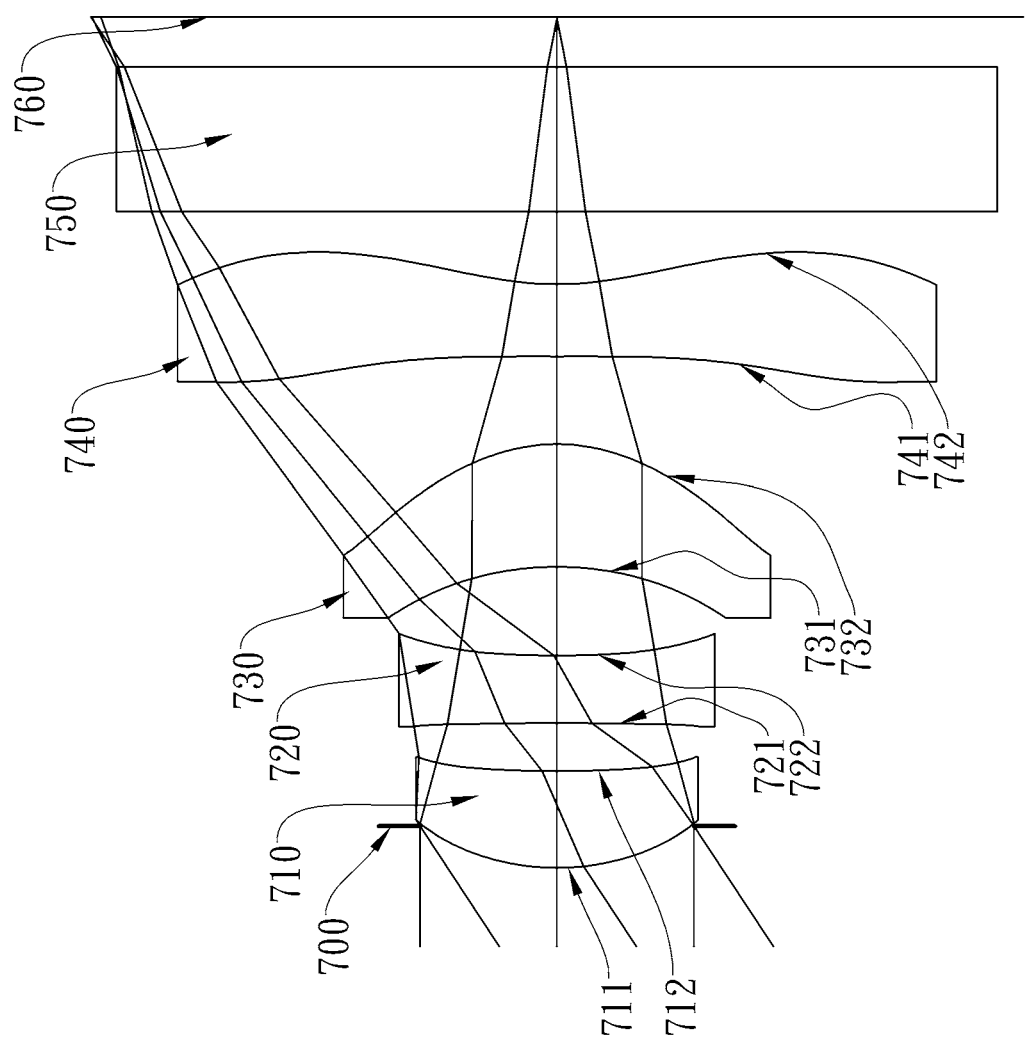
FIG. 7A shows a photographing optical system in accordance with a seventh embodiment of the present invention.
Figure 7B:
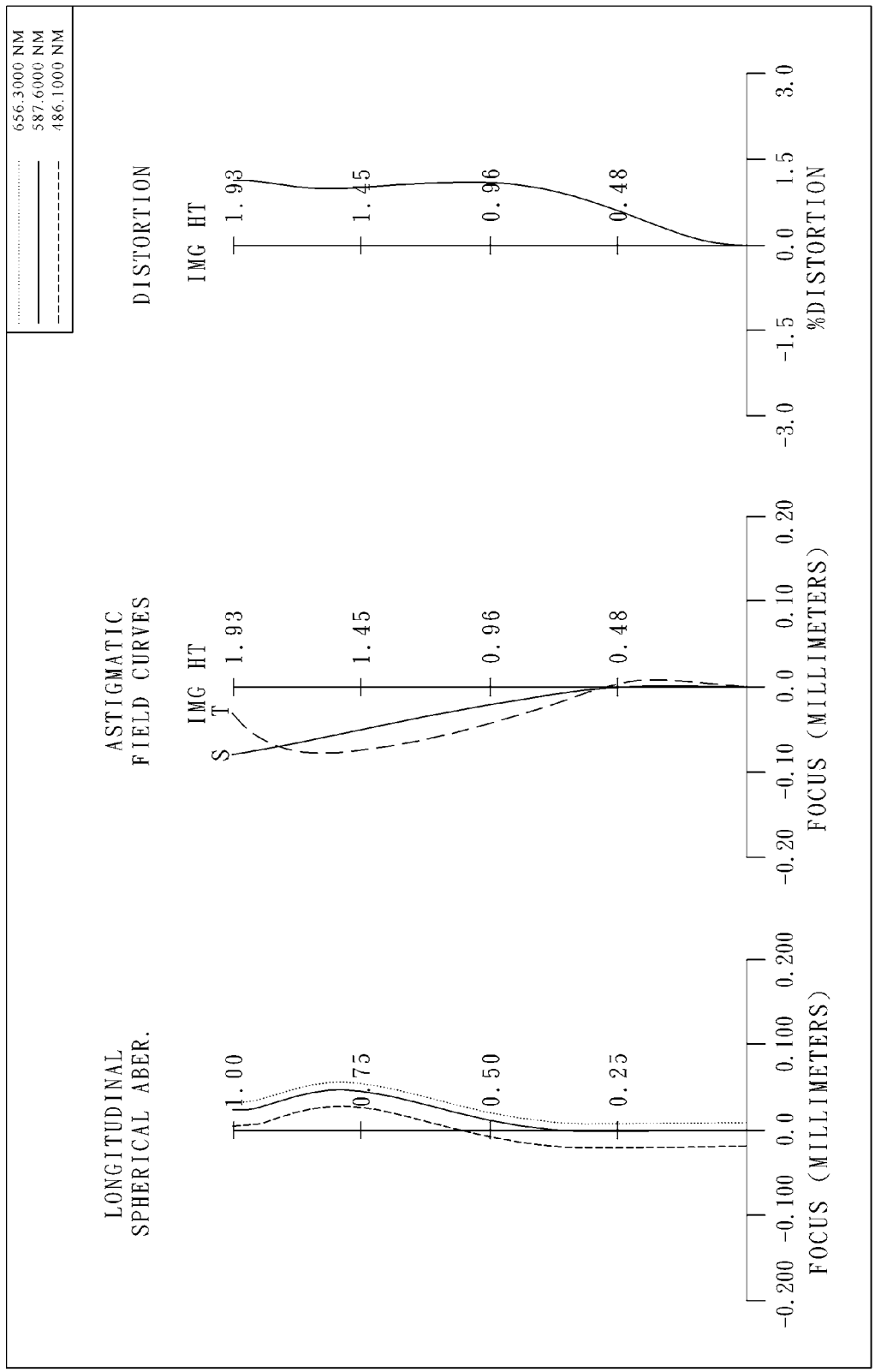
FIG. 7B shows the aberration curves of the seventh embodiment of the present invention.

FIG. 7A shows a photographing optical system in accordance with the seventh embodiment of the present invention, and FIG. 7B shows the aberration curves of the seventh embodiment of the present invention. The photographing optical system of the seventh embodiment of the present invention mainly comprises four lens elements, in order from an object side to an image side:

a plastic first lens element 710 with positive refractive power having a convex object-side surface 711 and a concave image-side surface 712, the object-side and image-side surfaces 711 and 712 thereof being aspheric;

a plastic second lens element 720 with negative refractive power having a concave object-side surface 721 and a concave image-side surface 722, the object-side and image-side surfaces 721 and 722 thereof being aspheric;

a plastic third lens element 730 with positive refractive power having a concave object-side surface 731 and a convex image-side surface 732, the object-side and image-side surfaces 731 and 732 thereof being aspheric; and a plastic fourth lens element 740 with negative refractive power having a convex object-side surface 741 and a concave image-side surface 742, the object-side and image-side surfaces 741 and 742 thereof being aspheric, and at least one inflection point is formed on both the object-side and image-side surfaces 741 and 742 thereof;

wherein an aperture stop 700 is disposed between an object and the first lens element 710;

the photographing optical system further comprises an IR filter 750 disposed between the image-side surface 742 of the fourth lens element 740 and an image plane 760, and the IR filter 750 is made of glass and has no influence on the focal length of the photographing optical system; the photographing optical system further comprises an image sensing unit provided on the image plane 760.

The equation of the aspheric surface profiles of the seventh embodiment has the same form as that of the first embodiment.

In the seventh embodiment of the present photographing optical system, the focal length of the photographing optical system is f, and it satisfies the relation: f=2.92 (mm).

In the seventh embodiment of the present photographing optical system, the f-number of the photographing optical system is Fno, and it satisfies the relation: Fno=2.53.

In the seventh embodiment of the present photographing optical system, half of the maximal field of view of the photographing optical system is HFOV, and it satisfies the relation: HFOV=33.3 deg.

In the seventh embodiment of the present photographing optical system, the Abbe number of the first lens element 710 is V1, the Abbe number of the second lens element 720 is V2, and they satisfy the relation: V1−V2=32.1.

In the seventh embodiment of the present photographing optical system, the on-axis spacing between the first lens element 710 and the second lens element 720 is T12, the on-axis spacing between the second lens element 720 and the third lens element 730 is T23, and they satisfy the relation: T12/T23=0.54.

In the seventh embodiment of the present photographing optical system, the on-axis spacing between the second lens element 720 and the third lens element 730 is T23, the on-axis spacing between the third lens element 730 and the fourth lens element 740 is T34, and they satisfy the relation: T23/T34=1.01.

In the seventh embodiment of the present photographing optical system, the thickness of the fourth lens element 740 on the optical axis is CT4, a focal length of the photographing optical system is f, and they preferably satisfy the relation: CT4/f=0.10.

In the seventh embodiment of the present photographing optical system, the radius of curvature of the object-side surface 711 of the first lens element 710 is R1, the radius of curvature of the image-side surface 712 of the first lens element 710 is R2, and they satisfy the relation: (R1+R2)/(R1−R2)=−1.41.

In the seventh embodiment of the present photographing optical system, the radius of curvature of the object-side surface 721 of the second lens element 720 is R3, the radius of curvature of the image-side surface 722 of the second lens element 720 is R4, and they satisfy the relation: (R3+R4)/(R3−R4)=0.36.

In the seventh embodiment of the present photographing optical system, the radius of curvature of the object-side surface 731 of the third lens element 730 is R5, the radius of curvature of the image-side surface 732 of the third lens element 730 is R6, and they satisfy the relation: (R5+R6)/(R5−R6)=3.58.

In the seventh embodiment of the present photographing optical system, the radius of curvature of the image-side surface 742 of the fourth lens element 740 is R8, the radius of curvature of the object-side surface 741 of the fourth lens element 740 is R7, and they satisfy the relation: |R8/R7|=0.01.

In the seventh embodiment of the present photographing optical system, the focal length of the third lens element 730 is f3, the focal length of the second lens element 720 is f2, and they satisfy the relation: f3/f2=−0.50.

In the seventh embodiment of the present photographing optical system, a maximal distance between an on-axis site on which the object-side surface 741 of the fourth lens element 740 projects and an on-axis vertex of the object-side surface 741 is SAG41max, a maximal distance between an on-axis site on which the image-side surface 742 of the fourth lens element 740 projects and an on-axis vertex of the image-side surface 742 is SAG42max, and they satisfy the relation: SAG41max/SAG42max=−0.80.

In the seventh embodiment of the present photographing optical system, a height between an optical axis and a site on the object-side surface 741 of the fourth lens element 740 which has a maximal distance between a projective image of the object-side surface 741 on the optical axis to the on-axis vertex thereof is Yp41; a height between an optical axis and a site on the image-side surface 742 of the fourth lens element 740 which has a maximal distance between a projective image of the image-side surface 742 on the optical axis to the on-axis vertex thereof is Yp42, and they satisfy the relation: Yp41/Yp42=1.38.

In the seventh embodiment of the present photographing optical system, the distance on the optical axis between the aperture stop 700 and the image sensing unit is SL, the distance on the optical axis between the object-side surface 711 of the first lens element 710 and the image sensing unit is TTL, and they satisfy the relation: SL/TTL=0.95.

In the seventh embodiment of the present photographing optical system, the distance on the optical axis between the object-side surface 711 of the first lens element 710 and the image sensing unit is TTL, half of the diagonal length of the effective pixel area of the image sensing unit is ImgH, and they preferably satisfy the relation: TTL/ImgH=1.73.

The detailed optical data of the seventh embodiment is shown in FIG. 20 (TABLE 13), and the aspheric surface data is shown in FIG. 21 (TABLE 14), wherein the units of the radius of curvature, the thickness and the focal length are expressed in mm, and HFOV is half of the maximal field of view.

It is to be noted that TABLES 1-14 (illustrated in FIGS. 8-21 respectively) show different data of the different embodiments, however, the data of the different embodiments are obtained from experiments. Therefore, any photographing optical system of the same structure is considered to be within the scope of the present invention even if it uses different data. The embodiments depicted above and the appended drawings are exemplary and are not intended to limit the scope of the present invention. TABLE 15 (illustrated in FIG. 22) shows the data of the respective embodiments resulting from the equations.

What is claimed is:

1. A photographing optical system comprising, in order from an object side to an image side:
   a first lens element with positive refractive power having a convex object-side surface and a concave image-side surface;
   a second lens element with negative refractive power having a concave image-side surface;
   a third lens element with positive refractive power having a concave object-side surface and a convex image-side surface; and
   a fourth lens element with negative refractive power having a concave image-side surface, both the object-side and image-side surfaces thereof being aspheric, made of plastic, and at least one inflection point is formed on at least one of the object-side and image-side surfaces of the fourth lens element;

wherein the photographing optical system comprises four lens elements with refractive power; a radius of curvature of the image-side surface of the fourth lens element is R8, a radius of curvature of the object-side surface of the fourth lens element is R7, an on-axis spacing between the first lens element and the second lens element is T12, an on-axis spacing between the second lens element and the third lens element is T23, a radius of curvature of the object-side surface of the third lens element is R5, a radius of curvature of the image-side surface of the third lens element is R6, the photographing optical system also comprises an aperture stop, a distance on an optical axis between the aperture stop and an image plane is SL, a distance on the optical axis between the object-side surface of the first lens element and the image plane is TTL, a maximal distance between an on-axis site on which the object-side surface of the fourth lens element projects and an on-axis vertex of the object-side surface of the fourth lens element is SAG41max, a maximal distance between an on-axis site on which the image-side surface of the fourth lens element projects and an on-axis vertex of the image-side surface of the fourth lens element is SAG42max, and they satisfy the following relations:

$|R8/R7|<0.15;$ $0.35<T12/T23<0.70;$ $2.0<(R5+R6)/(R5-R6)<4.5;$ $0.7<SL/TTL<1.2;$ and $-1.30<SAG41max/SAG42max<-0.45.$ 2. The photographing optical system according to claim 1, wherein a focal length of the third lens element is f3, a focal length of the second lens element is f2, and they satisfy the following relation:

$-0.7<f3/f2<-0.1.$

3. The photographing optical system according to claim 1, wherein a radius of curvature of the object-side surface of the first lens element is R1, a radius of curvature of the image-side surface of the first lens element is R2, and they satisfy the following relation:

$-2.1<(R1+R2)/(R1-R2)<-1.2.$

4. The photographing optical system according to claim 2, wherein the on-axis spacing between the second lens element and the third lens element is T23, an on-axis spacing between the third lens element and the fourth lens element is T34, and they satisfy the following relation:

$0.7<T23/T34<1.3.$

5. The photographing optical system according to claim 2, wherein the radius of curvature of the image-side surface of the fourth lens element is R8, the radius of curvature of the object-side surface of the fourth lens element is R7, and they satisfy the following relation:

$|R8/R7|<0.08.$

6. The photographing optical system according to claim 2, wherein the distance on the optical axis between the aperture stop and the image plane is SL, the distance on the optical axis between the object-side surface of the first lens element and the image plane is TTL, and they satisfy the following relation:

$0.9<SL/TTL<1.1.$

7. The photographing optical system according to claim 2, wherein a radius of curvature of the object-side surface of the second lens element is R3, a radius of curvature of the image-side surface of the second lens element is R4, and they satisfy the following relation:

$0.30<(R3+R4)/(R3-R4)<0.65.$

8. The photographing optical system according to claim 2, wherein an Abbe number of the first lens element is V1, an Abbe number of the second lens element is V2, and they satisfy the following relation:

$30<V1-V2<42.$

9. The photographing optical system according to claim 3, wherein a thickness of the fourth lens element on the optical axis is CT4, a focal length of the photographing optical system is f, and they satisfy the following relation:

$0.05<CT4/f<0.15.$

10. The photographing optical system according to claim 3, wherein a focal length of the third lens element is f3, a focal length of the second lens element is f2, and they satisfy the following relation:

$-0.6<f3/f2<-0.3.$

11. The photographing optical system according to claim 3, wherein the radius of curvature of the image-side surface of the fourth lens element is R8, the radius of curvature of the object-side surface of the fourth lens element is R7, and they satisfy the following relation:

$|R8/R7|<0.08.$

12. The photographing optical system according to claim 1, wherein an image sensing unit is further provided on the image plane; a distance on the optical axis between the object-side surface of the first lens element and the image plane is TTL, half of a diagonal length of an effective pixel area of the image sensing unit is ImgH, and they satisfy the following relation:

$TTL/ImgH<1.95.$

13. A photographing optical system comprising, in order from an object side to an image side:
- a first lens element with positive refractive power having a convex object-side surface and a concave image-side surface;
- a second lens element with negative refractive power having a concave object-side surface and a concave image-side surface;
- a third lens element with positive refractive power having a concave object-side surface and a convex image-side surface; and
- a fourth lens element with negative refractive power having a concave image-side surface, and both the object-side and image-side surfaces thereof being aspheric;
- wherein the photographing optical system comprises four lens elements with refractive power; a radius of curvature of the object-side surface of the first lens element is R1, a radius of curvature of the image-side surface of the first lens element is R2, a maximal distance between an on-axis site on which the object-side surface of the fourth lens element projects and an on-axis vertex of the object-side surface of the fourth lens element is SAG41max, a maximal distance between an on-axis site on which the image-side surface of the fourth lens element projects and an on-axis vertex of the image-side surface of the fourth lens element is SAG42max, the photographing optical system also comprises an aperture stop, a distance on an optical axis between the aperture stop and an image plane is SL, a distance on the optical axis between the object-side surface of the first lens element and the image plane is TTL, and they satisfy the following relations:

$-2.1 < (R1+R2)/(R1-R2) < -1.2;$ $-1.30 < SAG41\max/SAG42\max < -0.45;$ and $0.7 < SL/TTL < 1.2.$

14. The photographing optical system according to claim 13, wherein a height between an optical axis and a site on the object-side surface of the fourth lens element which has a maximal distance between a projective image of the object-side surface on the optical axis to the on-axis vertex thereof is Yp41; a height between an optical axis and a site on the image-side surface of the fourth lens element which has a maximal distance between a projective image of the image-side surface on the optical axis to the on-axis vertex thereof is Yp42, and they satisfy a following relation:

$1.0 < Yp41/Yp42 < 1.6.$

15. The photographing optical system according to claim 14, wherein a focal length of the third lens element is f3, a focal length of the second lens element is f2, and they satisfy the following relation:

$-0.6 < f3/f2 < -0.3.$

16. The photographing optical system according to claim 14, wherein a radius of curvature of the image-side surface of the fourth lens element is R8, a radius of curvature of the object-side surface of the fourth lens element is R7, and they satisfy the following relation:

$|R8/R7| < 0.15.$

17. The photographing optical system according to claim 14, wherein the distance on an optical axis between the aperture stop and the image plane is SL, the distance on the optical axis between the object-side surface of the first lens element and the image plane is TTL, and they satisfy the following relation:

$0.9 < SL/TTL < 1.1.$

18. The photographing optical system according to claim 13, wherein a thickness of the fourth lens element on the optical axis is CT4, a focal length of the photographing optical system is f, and they satisfy the following relation:

$0.05 < CT4/f < 0.15.$

19. The photographing optical system according to claim 18, wherein a radius of curvature of the object-side surface of the second lens element is R3, a radius of curvature of the image-side surface of the second lens element is R4, and they satisfy the following relation:

$0.30 < (R3+R4)/(R3-R4) < 0.65.$

* * * * *